(12) United States Patent
He et al.

(10) Patent No.: US 11,320,693 B2
(45) Date of Patent: May 3, 2022

(54) UNDER-DISPLAY ILLUMINATION WITH EXTERNAL LIGHT SOURCES

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 139 days.

(21) Appl. No.: 16/556,251

(22) Filed: Aug. 30, 2019

(65) Prior Publication Data

US 2021/0063816 A1   Mar. 4, 2021

(51) Int. Cl.
  *G06F 21/32*   (2013.01)
  *G02F 1/13357*   (2006.01)
  *G06F 3/041*   (2006.01)
  *G02F 1/1335*   (2006.01)

(52) U.S. Cl.
  CPC .. *G02F 1/133603* (2013.01); *G02F 1/133606* (2013.01); *G02F 1/133609* (2013.01); *G02F 1/133615* (2013.01); *G06F 3/0412* (2013.01); *G06F 21/32* (2013.01); *G02F 1/133607* (2021.01); *G02F 2201/123* (2013.01)

(58) Field of Classification Search
  CPC .. G06K 9/0004; G06K 9/00013; G06F 3/042; G06F 21/32; G02F 1/133603; G02F 1/133606; G02F 1/133609
  See application file for complete search history.

(56) References Cited

U.S. PATENT DOCUMENTS

| 2006/0011913 | A1* | 1/2006 | Yamazaki | H01L 27/1214 257/59 |
| 2006/0250558 | A1* | 11/2006 | Burns | H01L 27/1285 349/139 |
| 2014/0099060 | A1* | 4/2014 | Danley | G02B 6/4214 385/38 |

(Continued)

FOREIGN PATENT DOCUMENTS

| CN | 109154869 A | 1/2019 |
| CN | 109196525 A | 1/2019 |

(Continued)

*Primary Examiner* — Yuzhen Shen
(74) *Attorney, Agent, or Firm* — Kilpatrick Townsend & Stockton LLP

(57) ABSTRACT

Improved under-display illumination is provided for display modules integrated in electronic devices. For example, a display module can include a number of display micro-structures, such as pixels and electrodes. Much of the illumination energy from conventional under-display illumination (e.g., for backlighting) can tend to be blocked by the micro-structures and can also tend to damage the micro-structures. Novel arrangements of optical structures are provided herein to output under-display illumination energy and to direct the energy in a manner that passes completely or mostly through gaps between the display micro-structures. Some implementations provide additional features, such as light conditioning to facilitate transmission of light energy through a dark coating layer, and/or use of multiple optical structures to provide illumination energy with different optical characteristics.

18 Claims, 22 Drawing Sheets

(56) References Cited

U.S. PATENT DOCUMENTS

| | | | | |
|---|---|---|---|---|
| 2016/0087018 A1* | 3/2016 | Shim | ................... | H01L 51/5275 |
| | | | | 257/40 |
| 2018/0005005 A1* | 1/2018 | He | ....................... | G06K 9/0004 |
| 2018/0129798 A1* | 5/2018 | He | ........................... | G06F 3/042 |
| 2019/0113670 A1* | 4/2019 | Mackey | ............. | G06K 9/00053 |
| 2020/0019747 A1* | 1/2020 | Yang | ................... | H01L 27/3234 |
| 2020/0209729 A1* | 7/2020 | Chen | .................... | G03B 21/625 |

FOREIGN PATENT DOCUMENTS

| | | |
|---|---|---|
| CN | 109447027 A | 3/2019 |
| CN | 109478236 A | 3/2019 |
| CN | 110071152 A | 7/2019 |
| CN | 110753999 A | 2/2020 |
| WO | 2014198259 A1 | 12/2014 |
| WO | 2018188670 | 10/2018 |

\* cited by examiner

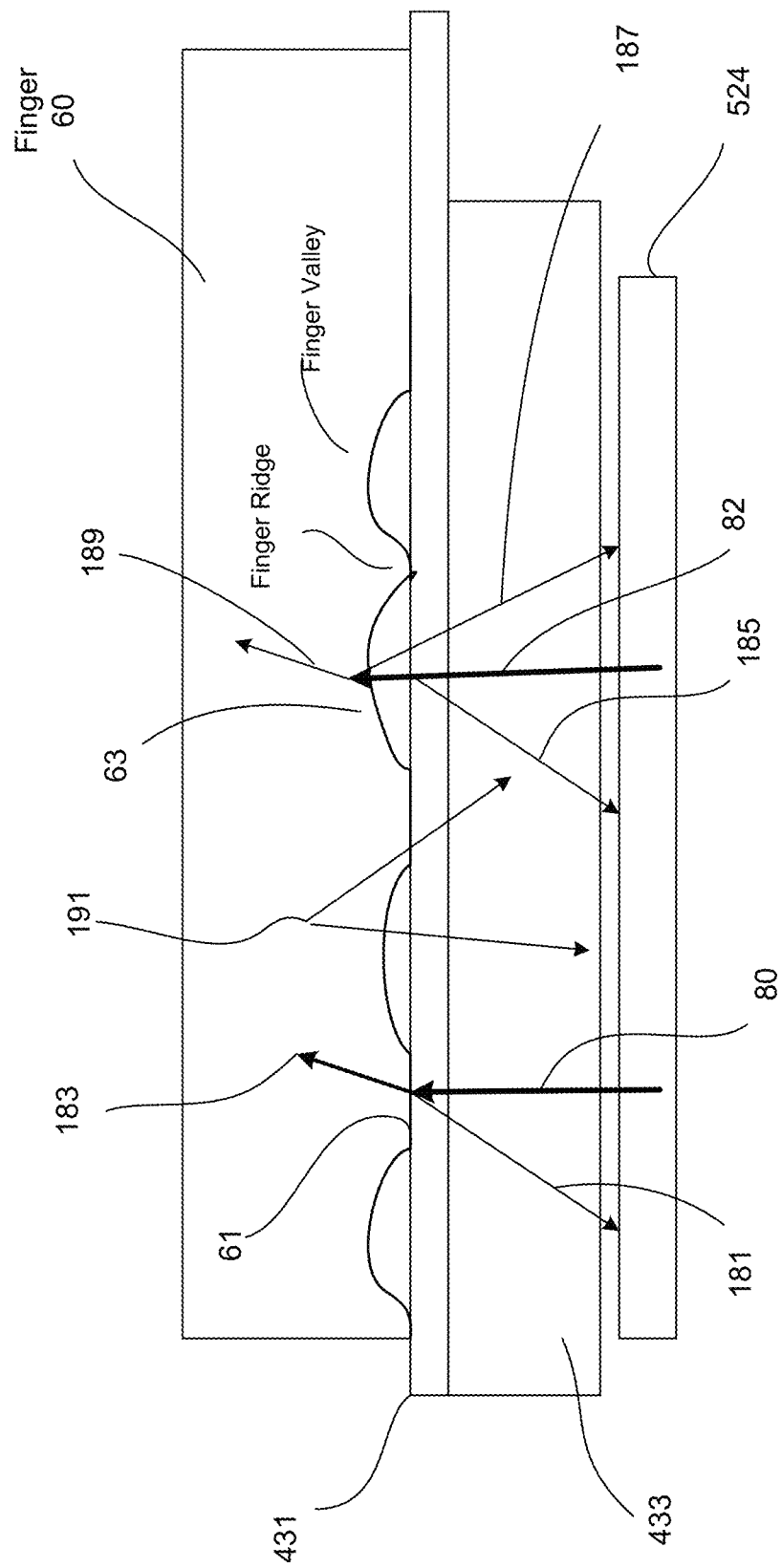

FIG. 5A 80, 82 - Illumination light beam for optical sensing
181 - Cover glass reflected light
183 - Light coupled into finger tissues
185 - Cover glass reflected light
187 - Finger skin reflected light
189 - Light coupled into finger tissues
191 - Light scattered by finger tissues into the bottom layers 524 - Bottom layers
431 - Cover glass
445 - Touching finger
433 - Display module
60 - Finger tissues
61 - Finger skin ridge
63 - Finger skin valley 524- Bottom layers
431- Cover glass
433- LCD Display module
60- Finger tissues
61- Finger skin ridge
63- Finger skin valley
201, 202- illumination light beams
205, 206- Cover glass reflected light 524- Bottom layers
431- Cover glass
433- Display module
60- Finger tissues
61- Finger skin ridge
63- Finger skin valley
211, 212- Illumination light beams
213, 214- Cover glass total reflected light 431 - Enhanced cover glass
433 - LCD display module
435 - Circuits
613 - Viewing zone
615 - Effective sensing zone
618 - Spacer with low RI
619 - Color coating
621 - Micro lens
623 - Photodiode array
625 - Detection axis 431- Enhanced cover glass
433- LCD display module
433b- LCD display module bottom
435- Circuits
613- Viewing zone
615- Effective sensing zone
618, 618b- Spacer with low RI
618c- Filling material
619, 619b- Color coating
621- Micro lens
623- Photodiode array
625- Detection axis 431- Enhanced cover glass
433- LCD display module
433b- LCD display module bottom
435- Circuits
613- Viewing zone
614- Extra light sources
615- Effective sensing zone
618, 618b- Spacer with low RI
618c- Filling material
619, 619b- Color coating
621- Micro lens
623- Photodiode array
625- Detection axis 431 - Enhanced cover glass
433 - LCD display module
433b - LCD display module bottom
435 - Circuits
615 - Effective sensing zone
628, 628b - Spacer with low RI
628c - Filling material
619, 619b - Color coating
621 - Micro lens
623 - Photodiode array
625 - Detection axis

UNDER-DISPLAY ILLUMINATION WITH EXTERNAL LIGHT SOURCES

TECHNICAL FIELD

This disclosure relates to liquid crystal displays, and, more particularly, to under-display illumination for liquid crystal displays, such as for backlighting and/or for probe lighting to support under-screen optical sensors, such as optical fingerprint sensors integrated within a display panel arrangement of mobile devices, wearable devices, and other computing devices.

BACKGROUND

Various sensors can be implemented in electronic devices or systems to provide certain desired functions. A sensor that enables user authentication is one example of sensors to protect personal data and prevent unauthorized access in various devices and systems including portable or mobile computing devices (e.g., laptops, tablets, smartphones), gaming systems, various databases, information systems or larger computer-controlled systems.

User authentication on an electronic device or system can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. Another example of sensors for electronic devices or systems is a biomedical sensor that detects a biological property of a user, e.g., a property of a user's blood, the heartbeat, in wearable devices like wrist band devices or watches. In general, different sensors can be provided in electronic devices to achieve different sensing operations and functions.

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Secured access to a device (e.g., a mobile device) or a system (e.g., an electronic database and a computer-controlled system) can be achieved in different ways such as the use of user passwords. A password, however, may be easily to be spread or obtained and this nature of passwords can reduce the level of the security of passwords. Moreover, since a user needs to remember a password in accessing password-protected electronic devices or systems, in the event that the user forgets the password, the user needs to undertake certain password recovery procedures to get authenticated or otherwise to regain the access to the device or system. Such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication through one or multiple forms of biometric identifiers to protect personal or other confidential data and prevent unauthorized access. A biometric identifier can be used alone or in combination with a password authentication method to provide user authentication. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

Embodiments provide improved under-display illumination for display modules integrated in electronic devices. A display module can include a number of display microstructures, such as pixels and electrodes. Much of the illumination energy from conventional under-display illumination (e.g., for backlighting) can tend to be blocked by the micro-structures and can also tend to damage the microstructures. Novel arrangements of optical structures are provided herein to output under-display illumination energy and to direct the energy in a manner that passes completely or mostly through gaps between the display micro-structures. Some implementations provide additional features, such as light conditioning to facilitate transmission of light energy through a dark coating layer, and/or use of multiple optical structures to provide illumination energy with different optical characteristics.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIGS. 5A-5C illustrate signal generation for the returned light from the sensing zone on the top sensing surface under two different optical conditions to facilitate the understanding of the operation of an under-screen optical fingerprint sensor module according to some embodiments.

Figure 1:
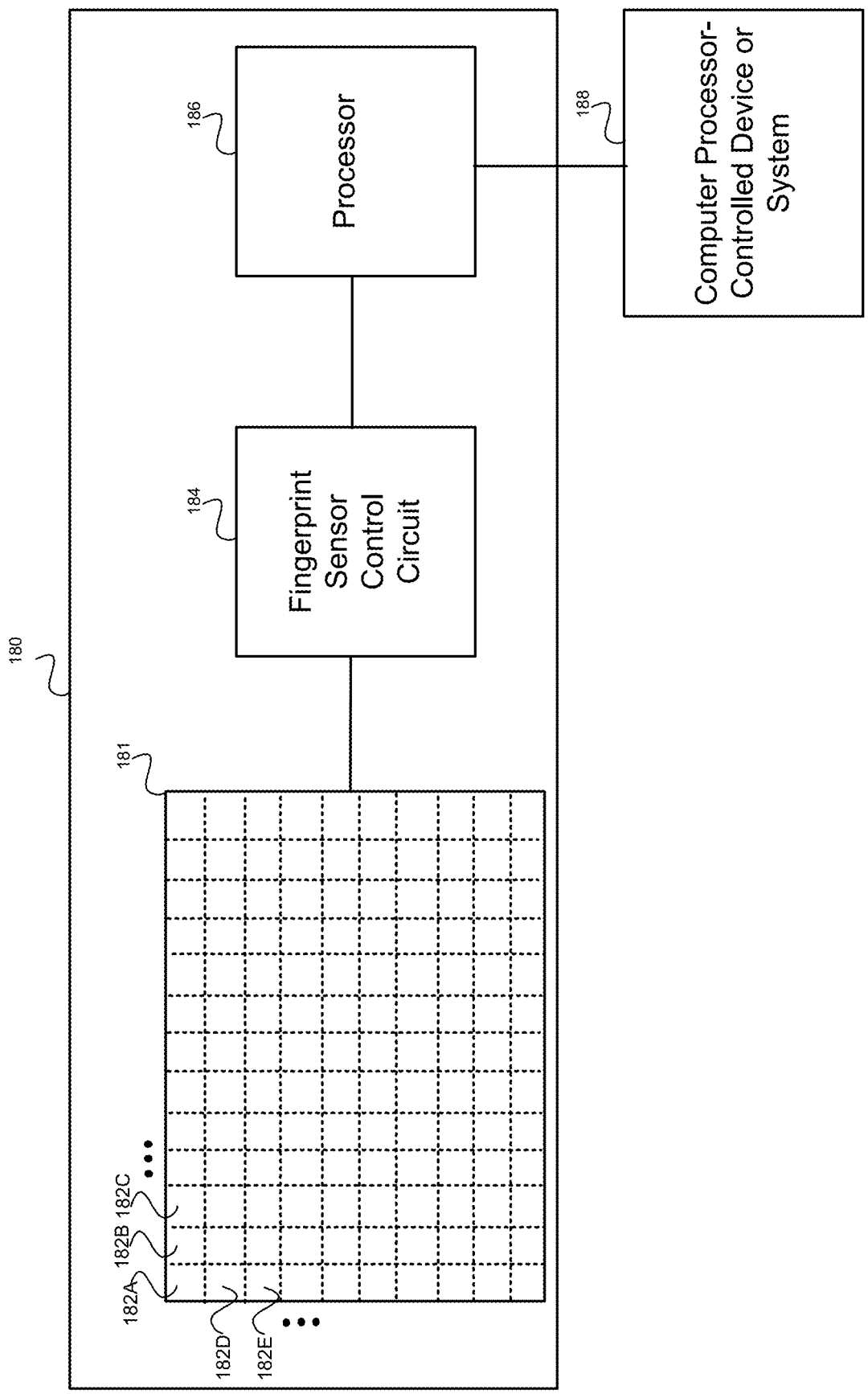
FIG. 1 is a block diagram of an example of a system with a fingerprint sensing module which can be implemented to include an optical fingerprint sensor according to some embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on the top surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imagining information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed through folded or complex optical paths to reach the optical detector array, thus allowing for flexibility in placing an optical fingerprint sensor in a device that is not available for a capacitive fingerprint sensor. Optical fingerprint sensor modules based on the technologies disclosure herein can be an under-screen optical fingerprint sensor module that is placed below a display screen to capture and detect light from a finger placed on or above the top sensing surface of the screen. As disclosed herein, optical sensing can also be used to, in addition to detecting and sensing a fingerprint pattern, optically detect other parameters associated with a user or a user action, such as whether a detected fingerprint is from a finger of a live person and to provide anti-spoofing mechanism, or certain biological parameters of the user.

I. Overview of Under-Display Optical Sensing Modules

The optical sensing technology and examples of implementations described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide white light illumination to the LCD pixels and matched optical filters to effectuate colored LCD pixels, or a display screen having light emitting display pixels without using backlight where each individual pixel generates light for forming a display image on the screen such as an organic light emitting diode (OLED) display screens, or electroluminescent display screens. The specific examples provided below are directed to integration of under-screen optical sensing modules with LCD screens and thus contain certain technical details associated with LCD screens although various aspects of the disclosed technology are applicable to OLED screens and other display screens.

A portion of the light produced by a display screen for displaying images necessarily passes through the top surface of the display screen in order to be viewed by a user. A finger in touch with or near the top surface interacts with the light at the top surface to cause the reflected or scattered light at the surface area of the touch to carry spatial image information of the finger. Such reflected or scattered light carrying the spatial image information of the finger returns to the display panel underneath the top surface. In touch sensing display devices, for example, the top surface is the touch sensing interface with the user and this interaction between the light for displaying images and the user finger or hand constantly occurs but such information-carrying light returning back to the display panel is largely wasted and is not used in various touch sensing devices. In various mobile or portable devices with touch sensing displays and fingerprint sensing functions, a fingerprint sensor tends to be a separate device from the display screen, either placed on the same surface of the display screen at a location outside the display screen area such as in some models of Apple iPhones and Samsung smartphones, or placed on the backside of a smartphone, such as some models of smart phones by Huawei, Lenovo, Xiaomi or Google, to avoid taking up valuable space for placing a large display screen on the front side. Those fingerprint sensors are separate devices from the display screens and thus need to be compact to save space for the display screens and other functions while still providing reliable and fast fingerprint sensing with a spatial image resolution above a certain acceptable level. However, the need to be compact and small for designing a fingerprint sensor and the need to provide a high spatial image resolution in capturing a fingerprint pattern are in direct conflict with each other in many fingerprint sensors because a high spatial image resolution in capturing a fingerprint pattern in based on various suitable fingerprint sensing technologies (e.g., capacitive touch sensing or optical imaging) requires a large sensor area with a large number of sensing pixels.

The sensor technology and examples of implementations of the sensor technology described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light in some implementations, or designated illumination or probe light for optical sensing from one or more designated illumination light sources separate from the display light for optical sensing in other implementations, or background light for optical sensing in certain implementations.

In the disclosed examples for integrating an optical sensing module to a LCD screen based on the disclosed optical sensor technology, the under LCD optical sensor can be used to detect a portion of the light that is used for displaying images in a LCD screen where such a portion of the light for the display screen may be the scattered light, reflected light or some stray light. For example, in some implementations, the image light of the LCD screen based on backlighting may be reflected or scattered back into the LCD display screen as returned light when encountering an object such as a user finger or palm, or a user pointer device like a stylus. Such returned light can be captured for performing one or more optical sensing operations using the disclosed optical sensor technology. Due to the use of the light from LCD screen for optical sensing, an optical fingerprint sensor module based on the disclosed optical sensor technology is specially designed to be integrated to the LCD display screen in a way that maintains the display operations and functions of the LCD display screen without interference while providing optical sensing operations and functions to enhance overall functionality, device integration and user experience of an electronic device or system such as a smart phone, a tablet, or a mobile and/or wearable device.

In addition, in various implementations of the disclosed optical sensing technology, one or more designated probe light sources may be provided to produce additional illumination probe light for the optical sensing operations by the under-LCD screen optical sensing module. In such applications, the light from the backlighting of the LCD screen and the probe light from the one or more designated probe light sources collectively form the illumination light for optical sensing operations.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint senor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical fingerprint sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

With respect to useful operations or control features in connection with the touch sensing aspect of the LCD display screen, the disclosed optical sensor technology can provide triggering functions or additional functions based on one or more sensing results from the optical fingerprint sensor module to perform certain operations in connection with the touch sensing control over the LCD display screen. For example, the optical property of a finger skin (e.g., the index of refraction) tends to be different from other artificial objects. Based on this, the optical fingerprint sensor module may be designed to selectively receive and detect returned light that is caused by a finger in touch with the surface of the LCD display screen while returned light caused by other objects would not be detected by the optical fingerprint sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical fingerprint sensor module to control the waking up circuitry operation of the LCD display screen which, the LCD pixels are put in a "sleep" mode by being turned off (and the LCD backlighting is also turned off) while one or more illumination light sources (e.g., LEDs) for the under-LCD panel optical fingerprint sensor module are turned on in a flash mode to intermittently emit flash light to the screen surface for sensing any touch by a person's finger or palm. Under this design, the optical fingerprint sensor module operates the one or more illumination light sources to produce the "sleep" mode wake-up sensing light flashes so that the optical fingerprint sensor module can detect returned light of such wake-up sensing light caused by the finger touch on the LCD display screen and, upon a positive detection, the LCD backlighting and the LCD display screen are turned on or "woken up". In some implementations, the wake-up sensing light can be in the infrared invisible spectral range so a user will not experience any visual of a flash light. The LCD display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the LCD display screen is turned on and in the other frame when the LCD display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

An optical fingerprint sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical fingerprint sensor module based on the disclosed optical sensor technology can be configured as a non-invasive module that can be easily integrated to a display screen without requiring changing the design of the LCD display screen for providing a desired optical sensing function such as fingerprint sensing. In this regard, an optical fingerprint sensor module based on the disclosed optical sensor technology can be independent from the design of a particular LCD display screen design due to the nature of the optical fingerprint sensor module: the optical sensing of such an optical fingerprint sensor module is by detecting the light that is emitted by the one or more illumination light sources of the optical fingerprint sensor module and is returned from the top surface of the display area, and the disclosed optical fingerprint sensor module is coupled to the backside of the LCD display screen as a under-screen optical fingerprint sensor module for receiving the returned light from the top surface of the display area and thus does not require a special sensing port or sensing area that is separate from the display screen area. Accordingly, such an under-screen optical fingerprint sensor module can be used to combine with a LCD display screen to provide optical fingerprint sensing and other sensor functions on an LCD display screen without using a specially designed LCD display screen with hardware especially designed for providing such optical sensing. This aspect of the disclosed optical sensor technology enables a wide range of LCD display screens in smartphones, tablets or other electronic devices with enhanced functions from the optical sensing of the disclosed optical sensor technology.

For example, for an existing phone assembly design that does not provide a separate fingerprint sensor as in certain Apple iPhones or Samsung Galaxy smartphones, such an existing phone assembly design can integrate the under-screen optical fingerprint sensor module as disclosed herein without changing the touch sensing-display screen assembly to provide an added on-screen fingerprint sensing function. Because the disclosed optical sensing does not require a separate designated sensing area or port as in the case of certain Apple iPhones/Samsung Galaxy phones with a front fingerprint senor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no external hardware button are needed on the exterior of a device are needed for adding the disclosed optical fingerprint sensor module for fingerprint sensing. The added optical fingerprint sensor module and the related circuitry are under the display screen inside the phone housing and the fingerprint sensing can be conveniently performed on the same touch sensing surface for the touch screen.

For another example, due to the above described nature of the optical fingerprint sensor module for fingerprint sensing, a smartphone that integrates such an optical fingerprint sensor module can be updated with improved designs, functions and integration mechanism without affecting or burdening the design or manufacturing of the LCD display screens to provide desired flexibility to device manufacturing and improvements/upgrades in product cycles while maintaining the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical fingerprint sensor module. Also, improved on-screen optical sensing for fingerprint sensing or other optical sensing functions by such an optical fingerprint sensor module can be added to a new product release by using a new version of the under-screen optical fingerprint sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices. The features for optical fingerprint sensor modules disclosed herein may be applicable to various display panels based on different technologies including both LCD and OLED displays. The specific examples below are directed to LCD display panels and optical fingerprint sensor modules placed under LCD display panels.

In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for securing access to various electronic devices and systems, including portable or mobile computing devices such as laptops, tablets, smartphones, and gaming devices, and other electronic devices or systems such as electronic databases, automobiles, bank ATMs, etc.

II. Design Examples of Under-Display Optical Sensing Modules

As described herein, embodiments provide brightness enhancement and diffuser film implementations (including some films with integrated brightness enhancement and diffuser structures) for integration into under-display optical sensing modules, including under-screen optical fingerprint modules. For the sake of added clarity and context, examples are described of various designs for an under-screen optical fingerprint sensor module for collecting an optical signal to the optical detectors and providing desired optical imaging such as a sufficient imaging resolution. These and other embodiments of under-display optical fingerprint sensing implementations are further described in the following patent documents, which are hereby incorporated by reference in their entirety: U.S. patent application Ser. No. 15/616,856; U.S. patent application Ser. No. 15/421,249; U.S. patent application Ser. No. 16/190,138; U.S. patent application Ser. No. 16/190,141; U.S. patent application Ser. No. 16/246,549; and U.S. patent application Ser. No. 16/427,269.

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A-182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to grant the requested access to the user account, or, upon a negative identification, may deny the access. For another example, the device or system 188 may be a smartphone or a portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

Figure 2A:
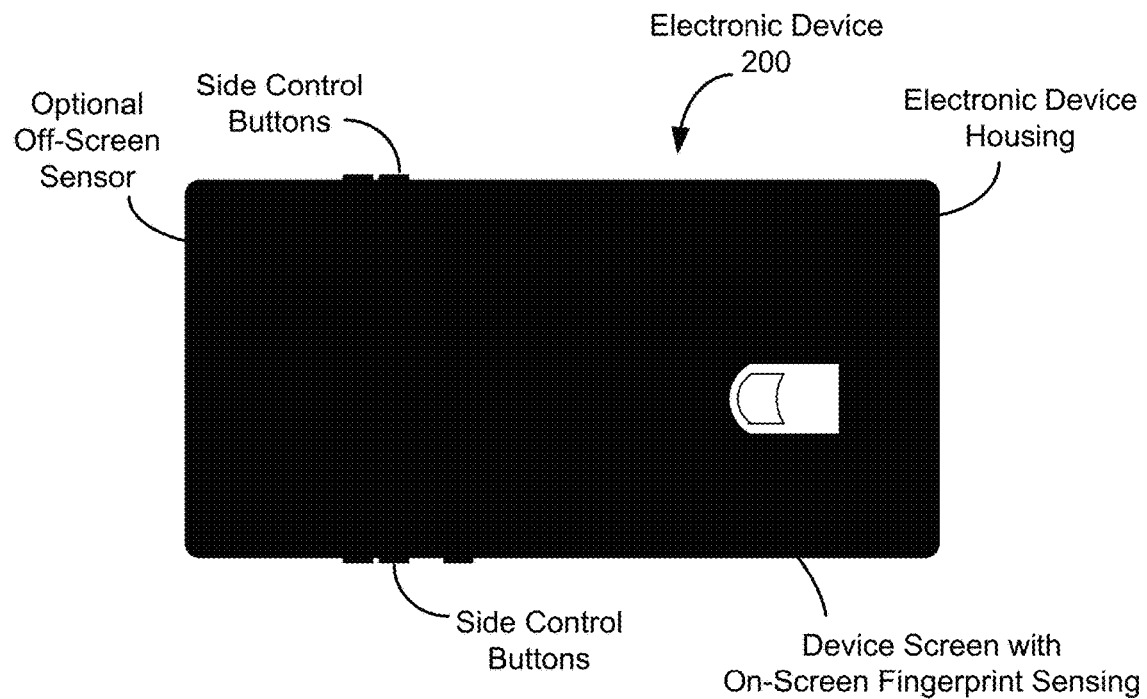
FIGS. 2A and 2B illustrate an exemplary implementation of an electronic device having a touch sensing display screen assembly and an optical fingerprint sensor module positioned underneath the touch sensing display screen assembly according to some embodiments.
Figure 2B:
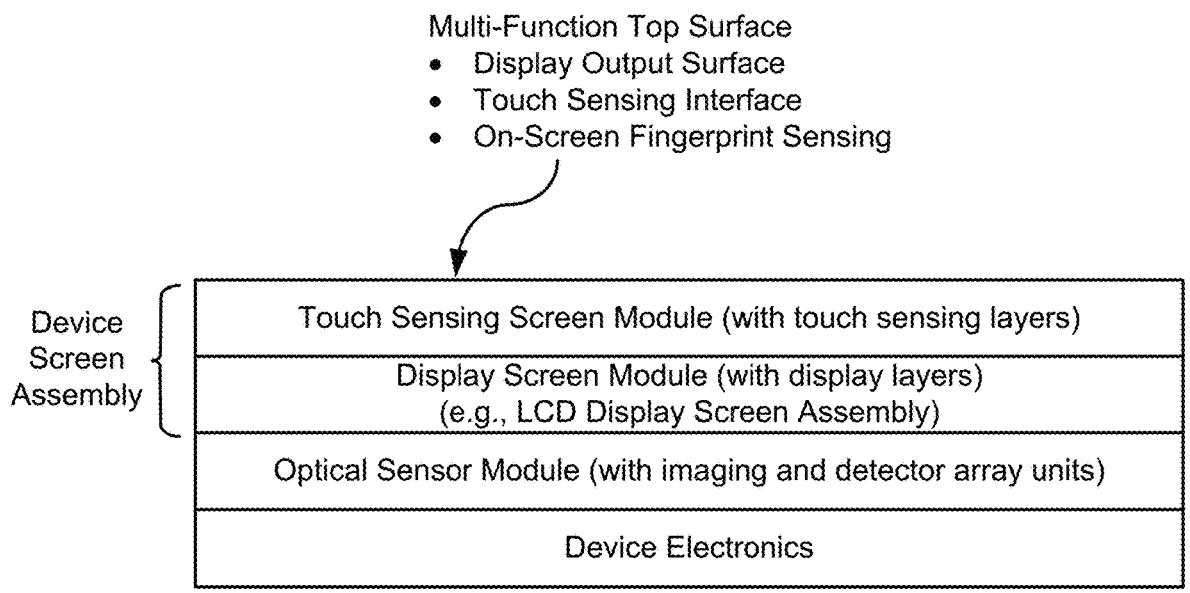

As a specific example, FIGS. 2A and 2B illustrate one exemplary implementation of an electronic device 200 having a touch sensing display screen assembly and an optical fingerprint sensor module positioned underneath the touch sensing display screen assembly. In this particular example, the display technology can be implemented by a LCD display screen with backlight for optically illuminating the LCD pixels or another display screen having light emitting display pixels without using backlight (e.g., an OLED display screen). The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical fingerprint sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical fingerprint sensor module is the device electronics structure containing certain electronic circuits for the optical fingerprint sensor module and other parts in the device 200. The device electronics may be arranged inside the device housing and may include a part that is under the optical fingerprint sensor module as shown in FIG. 2B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen is an LCD display having LCD layers and a thin film transistor (TFT) structure or substrate. A LCD display panel is a multi-layer liquid crystal display (LCD) module that includes LCD display backlighting light sources (e.g., LED lights) emitting LCD illumination light for LCD pixels, a light waveguide layer to guide the backlighting light, and LCD structure layers which can include, e.g., a layer of liquid crystal (LC) cells, LCD electrodes, transparent conductive ITO layer, an optical polarizer layer, a color filter layer, and a touch sensing layer. The LCD module also includes a backlighting diffuser underneath the LCD structure layers and above the light waveguide layer to spatially spread the backlighting light for illuminating the LCD display pixels, and an optical reflector film layer underneath the light waveguide layer to recycle backlighting light towards the LCD structure layers for improved light use efficiency and the display brightness. For optical sensing, one or more separate illumination light sources are provided and are operated independently from the backlighting light sources of the LCD display module.

Referring to FIG. 2B, the optical fingerprint sensor module in this example is placed under the LCD display panel to capture the returned light from the top touch sensing surface and to acquire high resolution images of fingerprint patterns when user's finger is in touch with a sensing area on the top surface. In other implementations, the disclosed under-screen optical fingerprint sensor module for fingerprint sensing may be implemented on a device without the touch sensing feature.

Figure 3A:
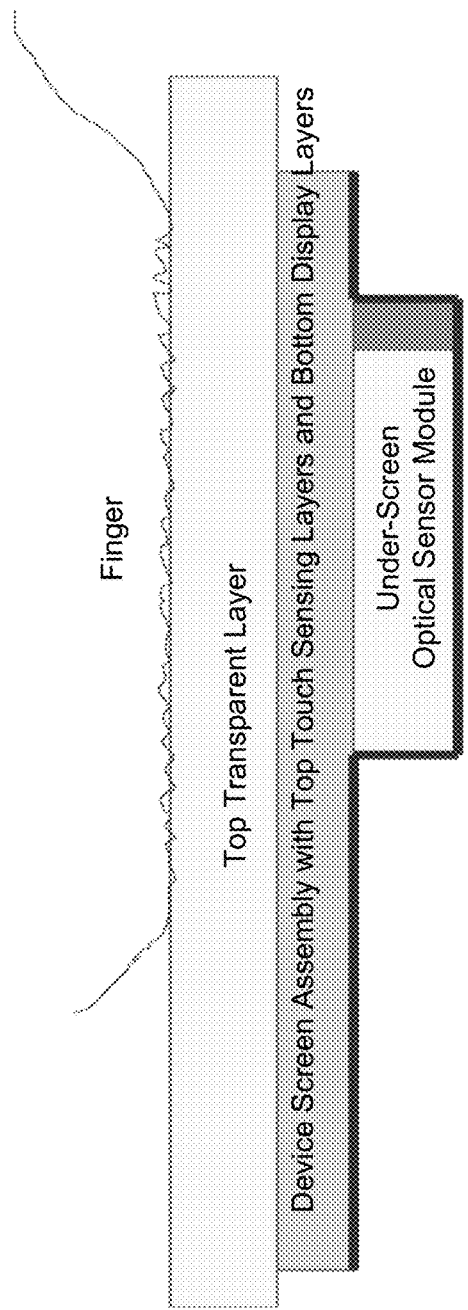
FIGS. 3A and 3B illustrate an example of a device that implements the optical fingerprint sensor module illustrated in FIGS. 2A and 2B according to some embodiments.
Figure 3B:
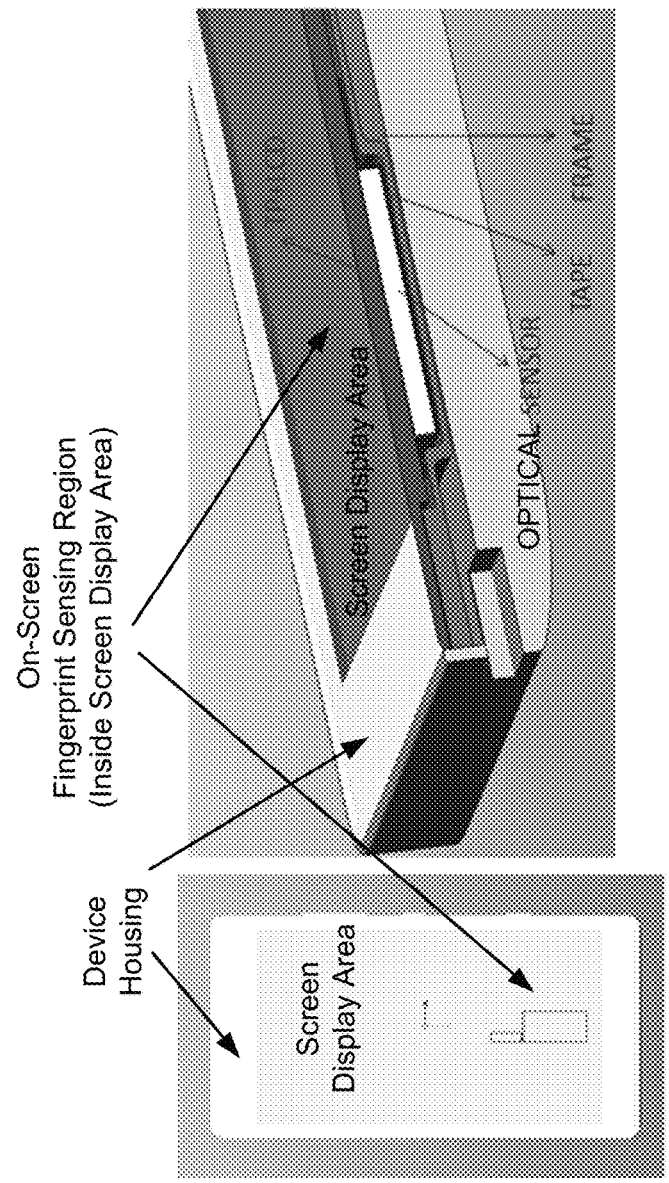

FIGS. 3A and 3B illustrate an example of a device that implements the optical fingerprint sensor module in FIGS. 2A and 2B. FIG. 3A shows a cross sectional view of a portion of the device containing the under-screen optical fingerprint sensor module. FIG. 3B shows, on the left, a view of the front side of the device with the touch sensing display indicating a fingerprint sensing area on the lower part of the display screen, and on the right, a perspective view of a part of the device containing the optical fingerprint sensor module that is under the device display screen assembly. FIG. 3B also shows an example of the layout of the flexible tape with circuit elements.

In the design examples in FIGS. 2A-2B, and 3A-3B, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 3A) so that the top surface of the cover glass serves as the top surface of the mobile device as a contiguous and uniform glass surface across both the display screen layers and the optical detector sensor that are vertically stacked and vertically overlap. This design example for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Referring back to FIGS. 2A and 2B, the illustrated under-screen optical fingerprint sensor module for on-screen fingerprint sensing may be implemented in various configurations. In one implementation, a device based on the above design can be structured to include a device screen a that provides touch sensing operations and includes a LCD display panel structure for forming a display image, a top cover layer formed over the device screen as an interface for being touched by a user for the touch sensing operations and for transmitting the light from the display structure to display images to a user, and an optical fingerprint sensor module located below the display panel structure to receive light that returns from the top cover layer to detect a fingerprint.

This device and other devices disclosed herein can be further configured to include various features. For example, a device electronic control module can be included in the device to grant a user's access to the device if a detected fingerprint matches a fingerprint an authorized user. In addition, the optical fingerprint sensor module is configured to, in addition to detecting fingerprints, also detect a biometric parameter different form a fingerprint by optical sensing to indicate whether a touch at the top cover layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the LCD display panel and to turn off power to the backlighting of the LCD display panel in a sleep mode, and the device electronic control module may be configured to wake up the display panel structure from the sleep mode when the optical fingerprint sensor module detects the presence of a person's skin at the designated fingerprint sensing region of the top cover layer. More specifically, in some implementations, the device electronic control module can be configured to operate one or more illumination light sources in the optical fingerprint sensor module to intermittently emit light, while turning off power to the LCD display panel (in the sleep mode), to direct the intermittently emitted illumination light to the designated fingerprint sensing region of the top cover layer for monitoring whether there is a person's skin in contact with the designated fingerprint sensing region for waking up the device from the sleep mode.

For another example, the device can include a device electronic control module coupled to the optical fingerprint sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top cover layer can include a designated fingerprint sensing region for a user to touch with a finger for fingerprint sensing and the optical fingerprint sensor module below the display panel structure can include a transparent block in contact with the display panel substrate to receive light that is emitted from the display panel structure and returned from the top cover layer, an optical sensor array that receives the light and an optical imaging module that images the received light in the transparent block onto the optical sensor array. The optical fingerprint sensor module can be positioned relative to the designated fingerprint sensing region and structured to selectively receive returned light via total internal reflection at the top surface of the top cover layer when in contact with a person's skin while not receiving the returned light from the designated fingerprint sensing region in absence of a contact by a person's skin.

For yet another example, the optical fingerprint sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Figure 4A:
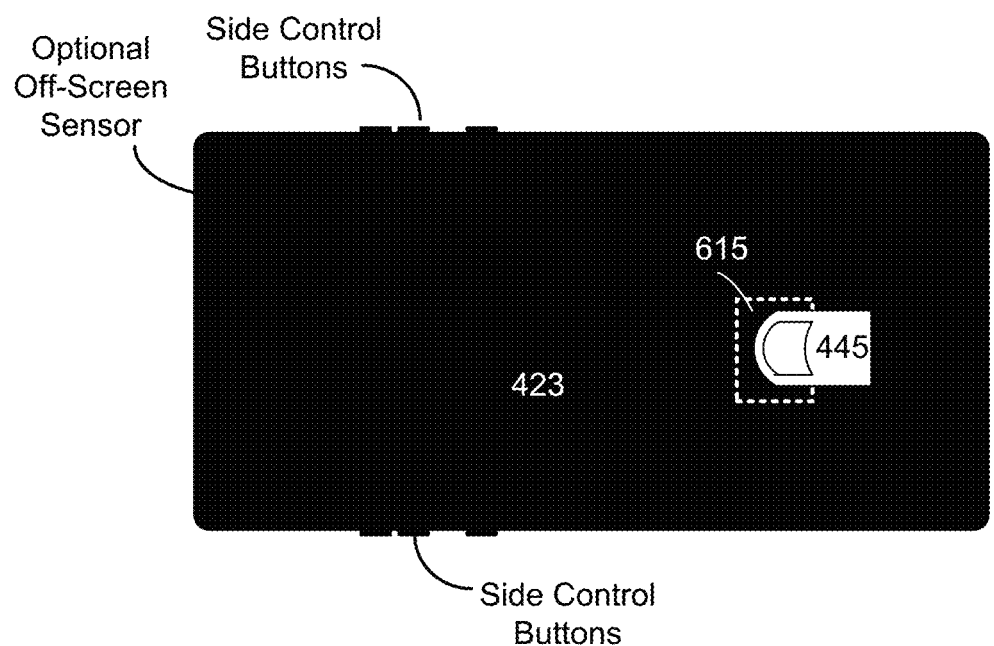
FIGS. 4A and 4B show an exemplary implementation of an optical fingerprint sensor module under the display screen assembly for implementing the design illustrated in FIGS. 2A and 2B according to some embodiments.
Figure 4B:
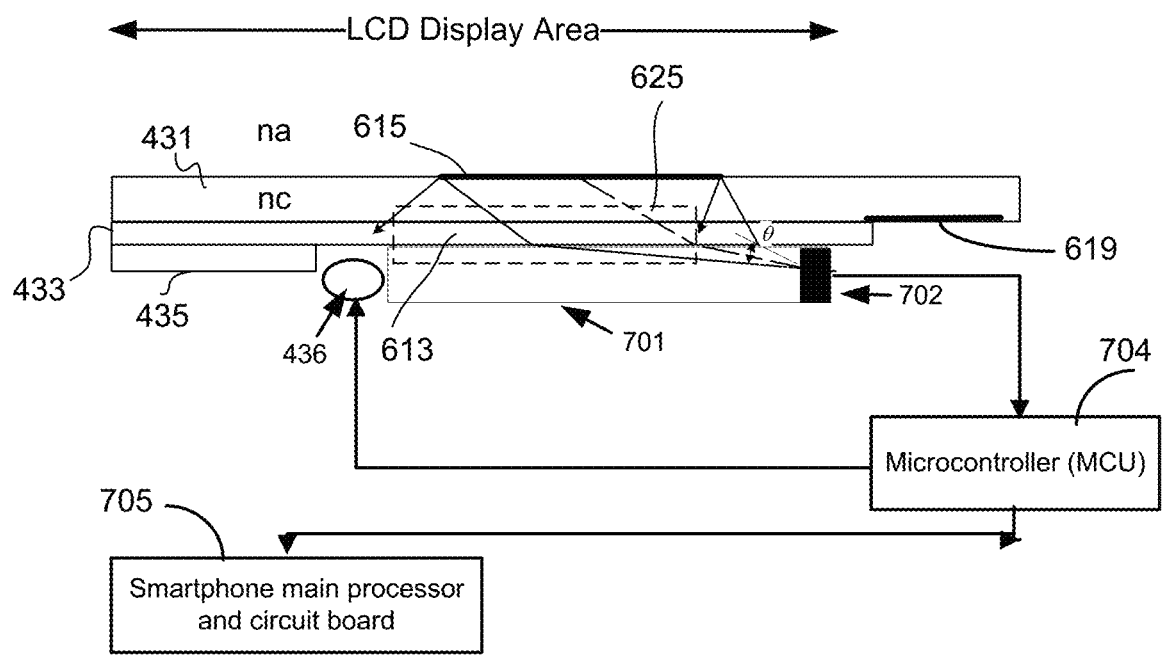

FIGS. 4A and 4B show an example of one implementation of an optical fingerprint sensor module under the display screen assembly for implementing the design in FIGS. 2A and 2B. The device illustrated in FIGS. 4A and 4B includes a display assembly 423 with a top cover layer 431 formed over the device screen assembly 423 as an interface for being touched by a user for the touch sensing operations and for transmitting the light from the display structure to display images to a user. This top cover layer 431 can be a cover glass or a crystal material in some implementations. The device screen assembly 423 can include a LCD display module 433 under the top cover layer 431. The LCD display layers allow partial optical transmission so light from the top surface can partially transmit through the LCD display layers to reach the under-LCD optical fingerprint sensor module. For example, LCD display layers include electrodes and wiring structure optically acting as an array of holes and light scattering objects. A device circuit module 435 may be provided under the LCD display panel to control operations of the device and perform functions for the user to operate the device.

The optical fingerprint sensor module 702 in this particular implementation example is placed under LCD display module 433. One or more illumination light sources, e.g., an illumination light source 436 under the LCD display module 433 or/and another one or more illumination light sources located under the top cover glass 431, are provided for providing the illumination light or probe light for the optical sensing by the optical fingerprint sensor module 702 and can be controlled to emit light to at least partially pass through the LCD display module 433 to illuminate the fingerprint sensing zone 615 on the top cover layer 431 within the device screen area for a user to place a finger therein for fingerprint identification. The illumination light from the one or more illumination light sources 436 can be directed to the fingerprint sensing area 615 on the top surface as if such illumination light is from a fingerprint illumination light zone 613. Another one or more illumination light sources may be located under the top cover glass 431 and may be placed adjacent to the fingerprint sensing area 615 on the top surface to direct produced illumination light to reach the top cover glass 433 without passing through the LCD display module 433. In some designs, one or more illumination light sources may be located above the bottom surface of the top cover glass 431 to direct produced illumination light to reach the fingerprint sensing region above the top surface of the top cover glass 433 without necessarily passing through the top cover glass 431, e.g., directing illuminating the finger above the top cover glass 431.

As illustrated in FIG. 4A, a finger 445 is placed in the illuminated fingerprint sensing zone 615 as the effective sensing zone for fingerprint sensing. A portion of the reflected or scattered light in the zone 615 is directed into the optical fingerprint sensor module underneath the LCD display module 433 and a photodetector sensing array inside the optical fingerprint sensor module receives such light and captures the fingerprint pattern information carried by the received light. The one or more illumination light sources 436 are separate from the backlighting sources for the LCD display module and are operated independently from the backlighting light sources of the LCD display module.

In this design of using one or more illumination light sources 436 to provide the illumination light for optical fingerprint sensing, each illumination light source 436 may be controlled in some implementations to turn on intermittently with a relatively low cycle to reduce the power used for the optical sensing operations. The fingerprint sensing operation can be implemented in a two-step process in some implementations: first, the one or more illumination light sources 436 are turned on in a flashing mode without turning on the LCD display panel to use the flashing light to sense whether a finger touches the sensing zone 615 and, once a touch in the zone 615 is detected, the optical sensing module is operated to perform the fingerprint sensing based on optical sensing and the LCD display panel may be turned on.

In the example in FIG. 4B, the under-screen optical fingerprint sensor module includes a transparent block 701 that is coupled to the display panel to receive the returned light from the top surface of the device assembly, and an optical imaging block 702 that performs the optical imaging and imaging capturing. Light from the one or more illumination light sources 436, after reaching the cover top surface, e.g., the cover top surface at the sensing area 615 where a user finger touches or is located without touching the cover top surface, is reflected or scattered back from the cover top surface in a design in which the illumination light source 436 is located to direct the illumination light to first transmit through the top cover glass 431 to reach the finger. When fingerprint ridges in contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the LCD display module 433, and, after passing through the small holes of the LCD display module 433, reaches the interface with the low index optically transparent block 701 of the optical fingerprint sensor module. The low index optically transparent block 701 is constructed to have a refractive index less than a refractive index of the LCD display panel so that the returned light can be extracted out of the LCD display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B, a control circuit 704 (e.g., a microcontroller or MCU) is coupled to the imaging sensing block 702 and to other circuitry such as the device main processor 705 on a main circuit board.

In this particular example, the optical light path design is structured so that the illumination light enters the cover top surface within the total reflection angles on the top surface between the substrate and air interface and, therefore, the reflected light is collected most effectively by the imaging optics and imaging sensor array in the block 702. In this design, the image of the fingerprint ridge/valley area exhibits a maximum contrast due to the total internal reflection condition at each finger valley location where the finger tissue does not touch the top cover surface of the top cover glass 431. Some implementations of such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sunlight or room illumination light) may enter the image sensor through the LCD panel top surface, and through holes in the LCD display assembly 433. Such background light can create a background baseline in the interested images from a finger and thus may undesirably degrade the contrast of a captured image. Different methods can be used to reduce this undesired baseline intensity caused by the background light. One example is to tune on and off the illumination light source 436 at a certain illumination modulation frequency f and the image sensor accordingly acquires the received images at the same illumination modulation frequency by phase synchronizing the light source driving pulse and image sensor frame. Under this operation, only one of the image phases contain light from the light source. In implementing this technique, the imaging capturing can be timed to capture images with the illumination light on at even (or odd) frames while turning off the illumination light at odd (or even) frames and, accordingly, subtracting even and odd frames can be used to obtain an image which is mostly formed by light emitted from the modulated illumination light source with significantly reduced background light. Based on this design, each display scan frame generates a frame of fingerprint signals and two sequential frames of signals are obtained by turning on the illumination light in one frame and off in the other frame. The subtraction of adjacent frames can be used to minimize or substantially reduce the ambient background light influence. In implementations, the fingerprint sensing frame rate can be one half of the display frame rate.

In the example shown in FIG. 4B, a portion of the light from the one or more illumination light sources 436 may also go through the cover top surface and enter the finger tissues. This part of the illumination light is scattered around and a part of this scattered light may be eventually collected by the imaging sensor array in the optical fingerprint sensor module 702. The light intensity of this scattered light is a result of interacting with the inner tissues of the finger and thus depends on the finger's skin color, the blood concentration in the finger tissue or the inner finger tissues. Such information of the finger is carried by this scattered light on the finger, is useful for fingerprint sensing, and can be detected as part of the fingerprint sensing operation. For example, the intensity of a region of user's finger image can be integrated in detection for measuring or observing in increase or decrease in the blood concentration that is associated with or depends on the phase of the user's heart-beat. This signature can be used to determine the user's heart beat rate, to determine if the user's finger is a live finger, or to provide a spoof device with a fabricated fingerprint pattern. Additional examples of using information in light carrying information on the inner tissues of a finger are provided in later sections of this patent document.

The one or more illumination light sources 436 in FIG. 4B can be designed to emit illumination light of different colors or wavelengths in some designs and the optical fingerprint sensor module can capture returned light from a person's finger at the different colors or wavelengths. By recording the corresponding measured intensity of the returned light at the different colors or wavelengths, information associated with the user's skin color, the blood flow or inner tissue structures inside the finger can be measured or determined. As an example, when a user registers a finger for fingerprint authentication operation, the optical fingerprint sensor can be operated to measure the intensity of the scatter light from the finger at two different colors or illumination light wavelengths associated with light color A and light color B, as intensities Ia and Ib, respectively. The ratio of Ia/Ib could be recorded to compare with later measurement when the user's finger is placed on the sensing area on the top sensing surface to measure the fingerprint. This method can be used as part of the device's anti spoofing system to reject a spoof device that is fabricated with a fingerprint emulating or being identical to a user's fingerprint but may not match user's skin color or other biological information of the user.

The one or more illumination light sources 436 can be controlled by the same electronics 704 (e.g., MCU) for controlling the image sensor array in the block 702. The one or more illumination light sources 436 can be pulsed for a short time (e.g., at a low duty cycle) to emit light intermittently and to provide pulse light for image sensing. The image sensor array can be operated to monitor the light pattern at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the one or more illumination light sources 436 for performing the optical fingerprint sensing), and use the normal mode to acquire a full fingerprint image. The image sensor array in the block 702 sends the acquired fingerprint image to the smartphone main processor 705 which can be operated to match the captured fingerprint image to the registered fingerprint database. If there is a match, the smartphone unlocks the phone to allow a user to access the phone and start the normal operation. If the captured image is not matched, the smartphone produces a feedback to user that the authentication is failed and maintains the locking status of the phone. The user may try to go through the fingerprint sensing again, or may input a passcode as an alternative way to unlock the phone.

In the example illustrated in FIGS. 4A and 4B, the under-screen optical fingerprint sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B for the illustrated example. The optically transparent block 701 and the front end of the imaging sensing block 702 before the photodetector sensing array forma a bulk imaging module to achieve proper imaging for the optical fingerprint sensing. Due to the optical distortions in this imaging process, a distortion correction can be used to achieve the desired imaging operation.

In the optical sensing by the under-screen optical fingerprint sensor module in FIGS. 4A and 4B and other designs disclosed herein, the optical signal from the sensing zone 615 on the top cover layer 431 to the under-screen optical fingerprint sensor module include different light components.

Figure 5B:
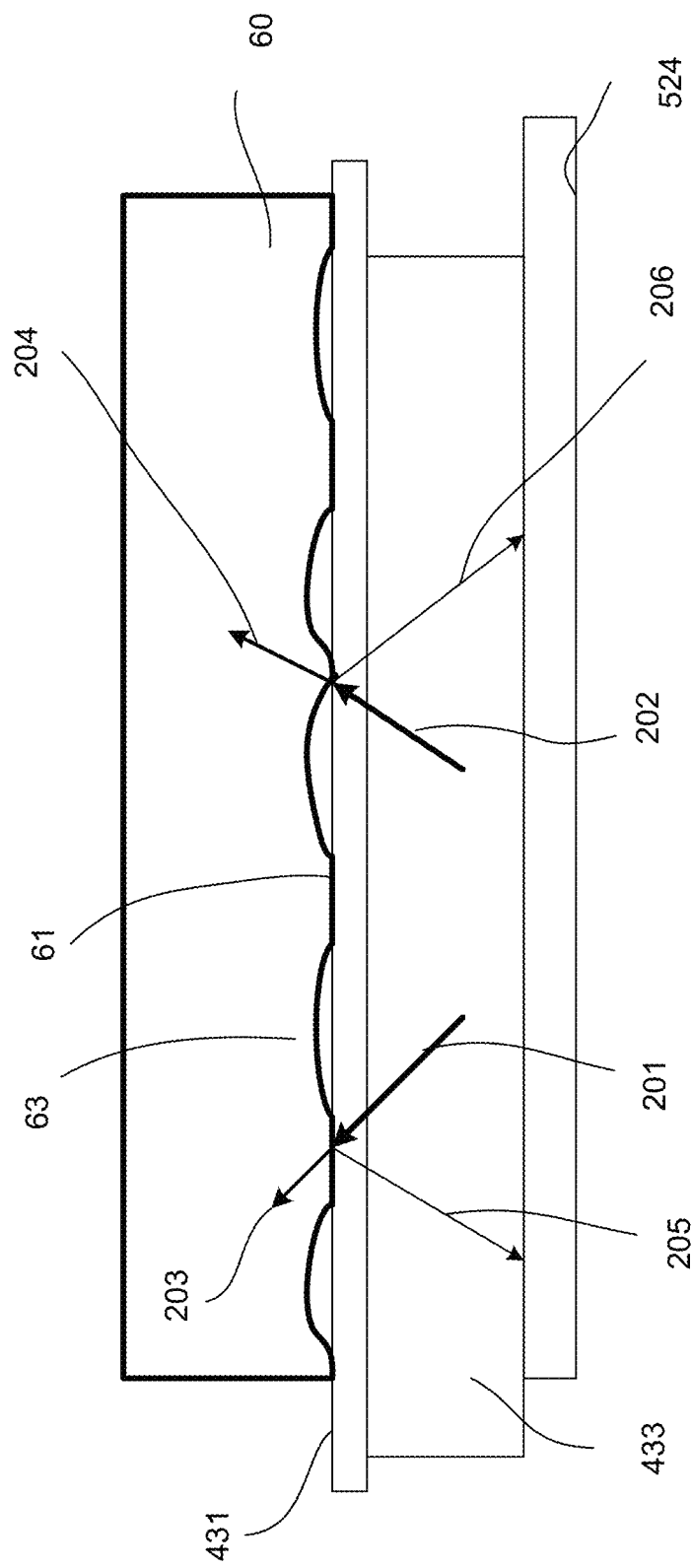
Figure 5C:
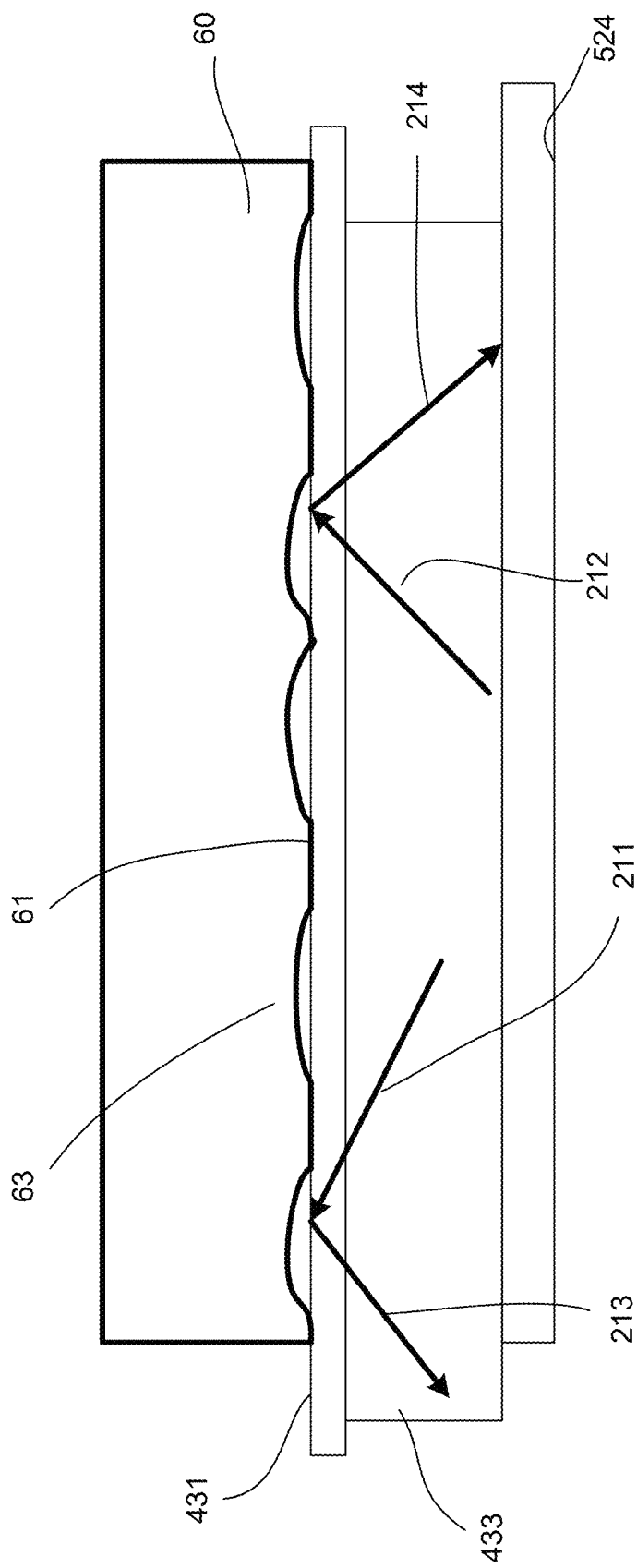

FIGS. 5A-5C illustrate signal generation for the returned light from the sensing zone 615 under different optical conditions to facilitate the understanding of the operation of the under-screen optical fingerprint sensor module. The light that enters into the finger, either from the illumination light source or from other light sources (e.g., background light) can generate internally scattered light in tissues below the finger surface, such as the scattered light 191 in FIGS. 5A-5C. Such internally scattered light in tissues below the finger surface can propagate through the internal tissues of the finger and subsequently transmits through the finger skin to enter the top cover layer 431 carrying certain information is not carried by light that is scattered, refracted or reflected by the finger surface, e.g., information on finger skin color, the blood concentration or flow characteristics inside the finger, or an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a finger.

FIG. 5A shows an example of how illumination light from the one or more illumination light sources 436 propagates through the OLED display module 433, after transmitting through the top cover layer 431, and generates different returned light signals including light signals that carry fingerprint pattern information to the under-screen optical fingerprint sensor module. For simplicity, two illumination rays 80 and 82 at two different locations are directed to the top cover layer 431 without experiencing total reflection at the interfaces of the top cover layer 431. Specifically, the illumination light rays 80 and 82 are perpendicular or nearly perpendicular to the top layer 431. A finger 60 is in contact with the sensing zone 615 on the e top cover layer 431. As illustrated, the illumination light beam 80 reaches to a finger ridge in contact with the top cover layer 431 after transmitting through the top cover layer 431 to generate the light beam 183 in the finger tissue and another light beam 181 back towards the LCD display module 433. The illumination light beam 82 reaches to a finger valley located above the top cover layer 431 after transmitting through the top cover layer 431 to generate the reflected light beam 185 from the interface with the top cover layer 431 back towards the LCD display module 433, a second light beam 189 that enters the finger tissue and a third light beam 187 reflected by the finger valley.

In the example in FIG. 5A, it is assumed that the finger skin's equivalent index of refraction is about 1.44 at 550 nm and the cover glass index of refraction is about 1.51 for the top cover layer 431. The finger ridge-cover glass interface reflects part of the beam 80 as reflected light 181 to bottom layers 524 below the LCD display module 433. The reflectance can be low, e.g., about 0.1% in some LCD panels. The majority of the light beam 80 becomes the beam 183 that transmits into the finger tissue 60 which causes scattering of the light 183 to produce the returned scattered light 191 towards the LCD display module 433 and the bottom layers 524. The scattering of the transmitted light beam 189 from the LCD pixel 73 in the finger tissue also contributes to the returned scattered light 191.

The beam 82 at the finger skin valley location 63 is reflected by the cover glass surface. In some designs, for example, the reflection may be about 3.5% as the reflected light 185 towards bottom layers 524, and the finger valley surface may reflect about 3.3% of the incident light power (light 187) to bottom layers 524 so that the total reflection may be about 6.8%. The majority light 189 is transmitted into the finger tissues 60. Part of the light power in the transmitted light 189 in the figure tissue is scattered by the tissue to contribute to the scattered light 191 towards and into the bottom layers 524.

Therefore, in the example in FIG. 5A, the light reflections from various interface or surfaces at finger valleys and finger ridges of a touching finger are different and the reflection ratio difference carries the fingerprint map information and can be measured to extract the fingerprint pattern of the portion that is in contact with the top cover layer 431 and is illuminated the OLED light.

FIGS. 5B and 5C illustrate optical paths of two additional types of illumination light rays at the top surface under different conditions and at different positions relative to valleys or ridges of a finger, including under a total reflection condition at the interface with the top cover layer 431. The illustrated illumination light rays generate different returned light signals including light signals that carry fingerprint pattern information to the under-screen optical fingerprint sensor module. It is assumed that the cover glass 431 and the LCD display module 433 are glued together without any air gap in between so that illumination light with a large incident angle to the cover glass 431 will be totally reflected at the cover glass-air interface. FIGS. 5A, 5B and 5C illustrate examples of three different groups divergent light beams: (1) central beams 82 with small incident angles to the cover glass 431 without the total reflection (FIG. 5A), (2) high contrast beams 201, 202, 211, 212 that are totally reflected at the cover glass 431 when nothing touches the cover glass surface and can be coupled into finger tissues when a finger touches the cover glass 431 (FIGS. 5B and 5C), and (3) escaping beams having very large incident angles that are totally reflected at the cover glass 431 even at a location where the finger issue is in contact.

For the central light beams 82, the cover glass surface in some designs may reflect about 0.1%~3.5% to light beam 185 that is transmitted into bottom layers 524, the finger skin may reflect about 0.1%~3.3% to light beam 187 that is also transmitted into bottom layers 524. The reflection difference is dependent on whether the light beams 82 meet with finger skin ridge 61 or valley 63. The rest light beam 189 is coupled into the finger tissues 60.

For high contrast light beams 201 and 202 meeting the local totally internal reflection condition, the cover glass surface reflects nearly 100% to light beams 205 and 206 respectively if nothing touches the cover glass surface. When the finger skin ridges touch the cover glass surface and at light beams 201 and 202 positions, most of the light power may be coupled into the finger tissues 60 by light beams 203 and 204.

For high contrast light beams 211 and 212 meeting the local totally internal reflection condition, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues 60.

As illustrated in FIG. 5A, a portion of the illumination light that is coupled into finger tissues 60 tends to experience random scattering by the inner finger tissues to form low-contrast light 191 and part of such low-contrast light 191 can pass through the LCD display module 433 to reach to the optical fingerprint sensor module. This portion of light captured by optical fingerprint sensor module contains additional information on the finger skin color, blood characteristics and the finger inner tissue structures associated with the fingerprint. Additional features for using internally scattered light in tissues below the finger surface in optical sensing will be explained in later part of this patent document, such as obtaining an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a finger. Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design illustrated in FIGS. 2A and 2B. For example, the specific implementation in FIG. 4B based on optical imaging by using a bulk imaging module in the optical sensing module can be implemented in various configurations.

Figure 6A:
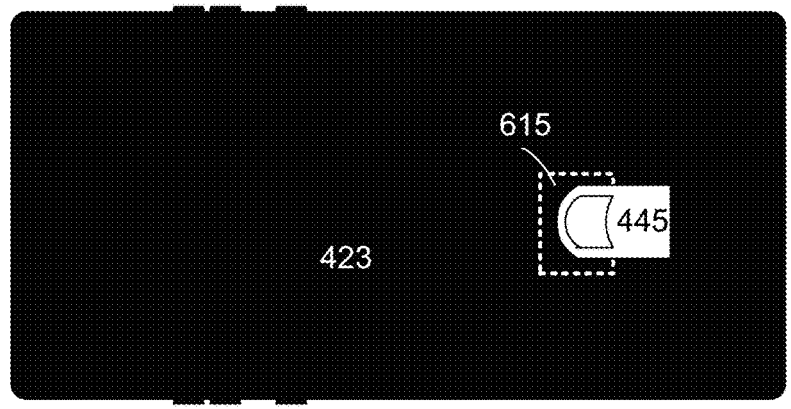
FIGS. 6A-6C, 7, 8A-8B, 9, and 10A-10B illustrate example designs of under-screen optical fingerprint sensor modules according to some embodiments.
Figure 6B:
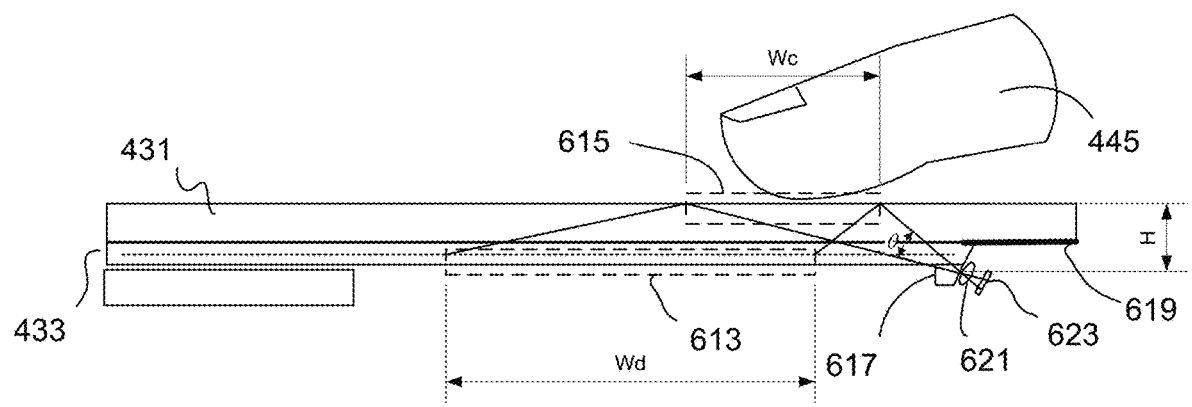
Figure 6C:
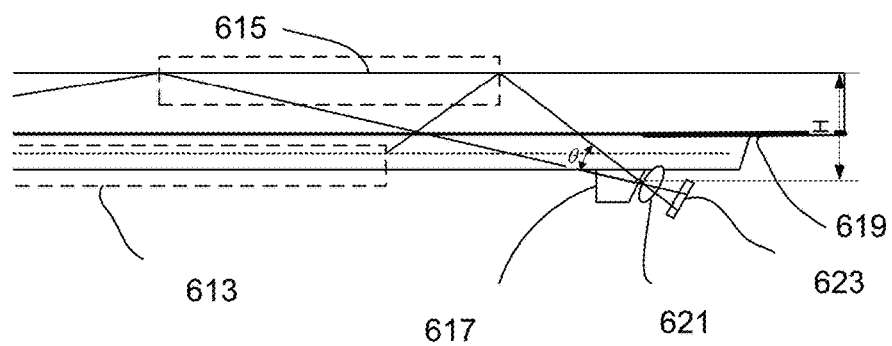

FIGS. 6A-6C show an example of an under-screen optical fingerprint sensor module based on optical imaging via a lens for capturing a fingerprint from a finger 445 pressing on the display cover glass 423. FIG. 6C is an enlarged view of the optical fingerprint sensor module part shown in FIG. 6B. The under-screen optical fingerprint sensor module as shown in FIG. 6B is placed under the LCD display module 433 includes an optically transparent spacer 617 that is engaged to the bottom surface of the LCD display module 433 to receive the returned light from the sensing zone 615 on the top surface of the top cover layer 431, an imaging lens 621 that is located between and spacer 617 and the photodetector array 623 to image the received returned light from the sensing zone 615 onto the photodetector array 623. Different from FIG. 4B showing an example of an optical projection imaging system without a lens, the example of the imaging design in FIG. 6B used the imaging lens 621 to capture the fingerprint image at the photodetector array 623 and enables an image reduction by the design of the imaging lens 621. Similar to the imaging system in the example in FIG. 4B to some extent, this imaging system in FIG. 6B for the optical fingerprint sensor module can experience image distortions and a suitable optical correction calibration can be used to reduce such distortions, e.g., the distortion correction methods described for the system in FIG. 4B.

Similar to the assumptions in FIGS. 5A-5C, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass top surface, and the total reflection angle is about 73.7° if the finger skin touches the cover glass top surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired part of the cover glass surface in the sensing zone 615. For example, the viewing angle may be aligned to detect the total inner reflection of the LCD display assembly. Specifically, the viewing angle θ is aligned to sense the effective sensing zone 615 on the cover glass surface. The effective sensing cover glass surface 615 may be viewed as a mirror so that the photodetector array effectively detects an image of the fingerprint illumination light zone 613 in the LCD display that is projected by the sensing cover glass surface 615 onto the photodetector array. The photodiode/photodetector array 623 can receive the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometrics of the optical detection path are known, the fingerprint image distortion caused in the optical path in the optical fingerprint sensor module can be corrected.

Consider, as a specific example, that the distance H in FIG. 6B from the detection module central axis to the cover glass top surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top cover layer 431.

Figure 7:
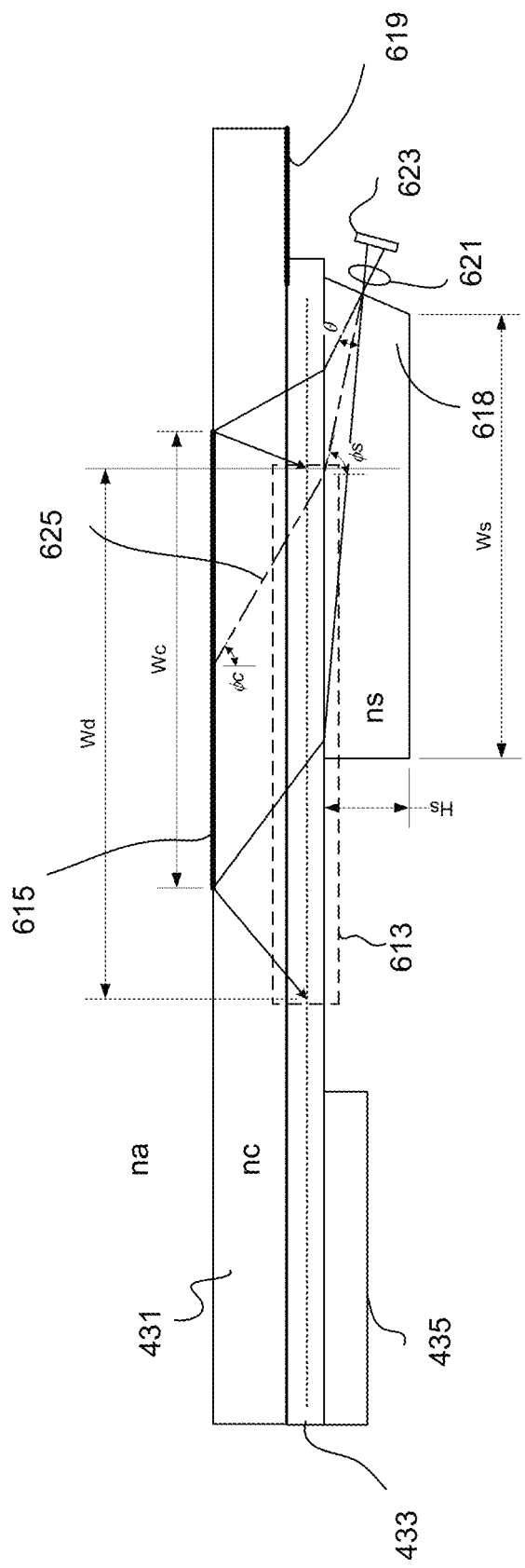

FIG. 7 shows an example of further design considerations of the optical imaging design for the optical fingerprint sensor module shown in FIGS. 6A-6C by using a special spacer 618 to replace the spacer 617 in FIGS. 6B-6C to increase the size of the sensing area 615. The spacer 618 is designed with a width Ws and thickness is Hs to have a low refraction index (RI) ns, and is placed under the LCD display module 433, e.g., being attached (e.g., glued) to the bottom surface the LCD display module 433. The end facet of the spacer 618 is an angled or slanted facet that interfaces with the micro lens 621. This relative position of the spacer and the lens is different from FIGS. 6B-6C, where the lens is placed underneath the spacer 617. The micro lens 621 and a photodiode array 623 are assembled into the optical detection module with a detection angle width θ. The detection axis 625 is bent due to optical refraction at the interface between the spacer 618 and display module 433 and at the interface between the cover glass 431 and the air. The local incident angle φ1 and φ2 are decided by the refractive indices RIs, ns, nc, and na of the materials for the components.

If nc is greater than ns, φ1 is greater than φ2. Thus, the refraction enlarges the sensing width Wc. For example, assuming the finger skin's equivalent RI is about 1.44 at 550 nm and the cover glass index RI is about 1.51, the total reflection incident angle is estimated to be about 41.8° if nothing touches the cover glass top surface, and the total reflection angle is about 73.7° if the finger skin touches the cover glass top surface. The corresponding total reflection angle difference is about 31.9°. If the spacer 618 is made of same material of the cover glass, and the distance from the detection module center to the cover glass top surface is 2 mm, if detection angle width is θ=31.9°, the effective sensing area width Wc is about 5 mm. The corresponding central axis's local incident angle is φ1=φ2=57.75°. If the material for the special spacer 618 has a refractive index ns about 1.4, and Hs is 1.2 mm and the detection module is tilted at φ1=70°. The effective sensing area width is increased to be greater than 6.5 mm. Under those parameters, the detection angle width in the cover glass is reduced to 19°. Therefore, the imaging system for the optical fingerprint sensor module can be designed to desirably enlarge the size of the sensing area 615 on the top cover layer 431.

The refractive index RI of the special spacer 618 is designed to be sufficiently low (e.g., to use $MgF_2$, $CaF_2$, or even air to form the spacer), the width Wc of the effective sensing area 615 is no longer limited by the thickness of the cover glass 431 and the display module 433. This property provides desired design flexibility. In principle, if the detection module has a sufficient resolution, the effective sensing area may even be increased to cover the entire display screen.

Since the disclosed optical sensor technology can be used to provide a large sensing area for capturing a pattern, the disclosed under-screen optical fingerprint sensor modules may be used to capture and detect not only a pattern of a finger but a larger size patter such a person's palm that is associated with a person for user authentication.

Figure 8A:
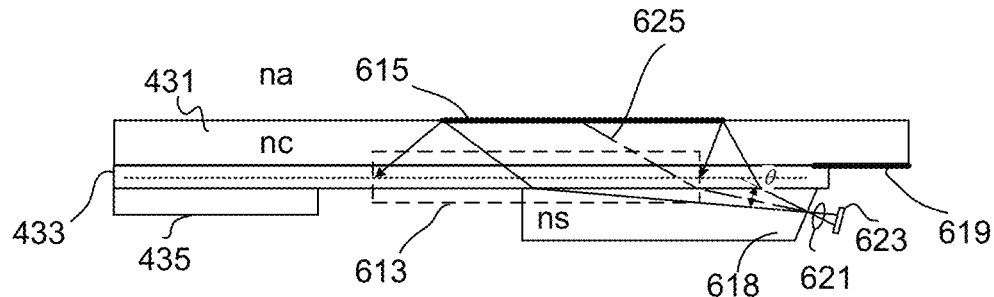
Figure 8B:
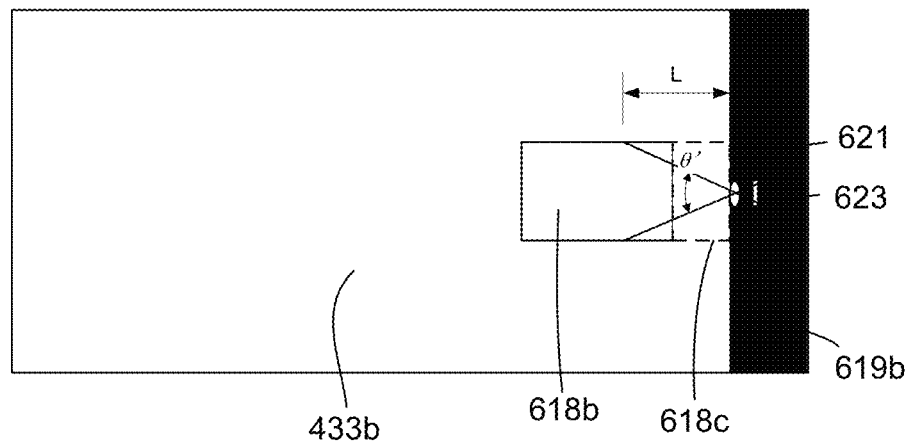

FIGS. 8A-8B show an example of further design considerations of the optical imaging design for the optical fingerprint sensor module shown in FIG. 7 by setting the detection angle θ' of the photodetector array relative in the display screen surface and the distance L between the lens 621 and the spacer 618. FIG. 8A shows a cross-sectional view along the direction perpendicular to the display screen surface, and FIG. 8B shows a view of the device from either the bottom or top of the displace screen. A filling material 618c can be used to fill the space between the lens 621 and the photodetector array 623. For example, the filling material 618c can be same material of the special spacer 618 or another different material. In some designs, the filling material 618c may the air space.

Figure 9:
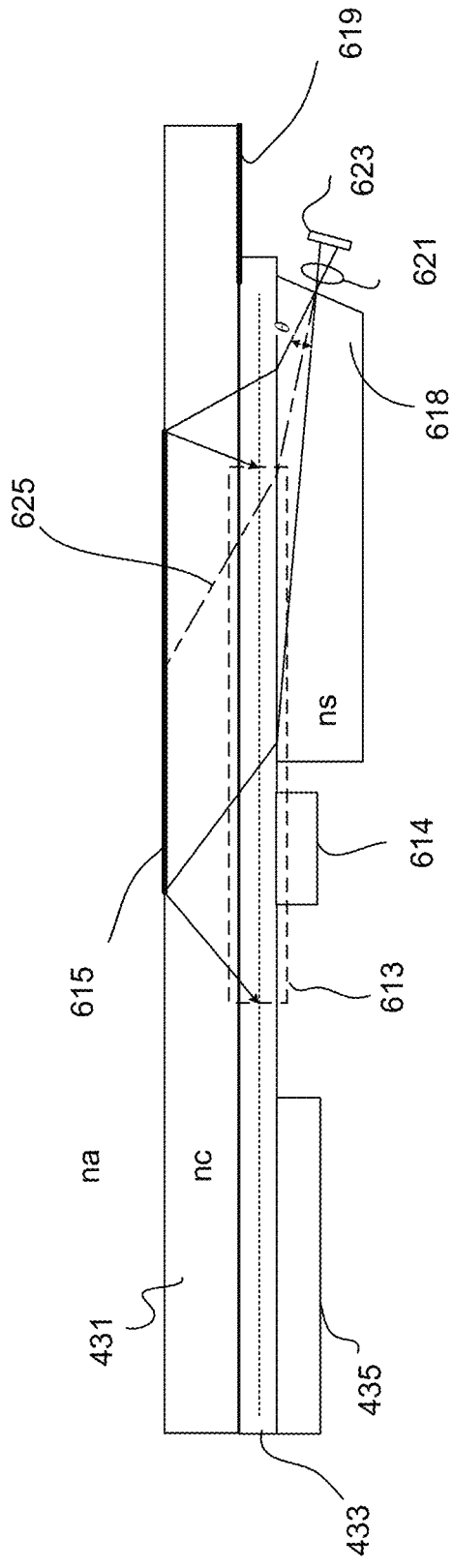

FIG. 9 shows another example of an under-screen optical fingerprint sensor module based on the design in FIG. 7 where one or more illumination light sources 614 are provided to illuminate the top surface sensing zone 615 for optical fingerprint sensing. The illumination light sources 614 may be of an expanded type, or be a collimated type so that all the points within the effective sensing zone 615 is illuminated. The illumination light sources 614 may be a single element light source or an array of light sources.

Figure 10A:
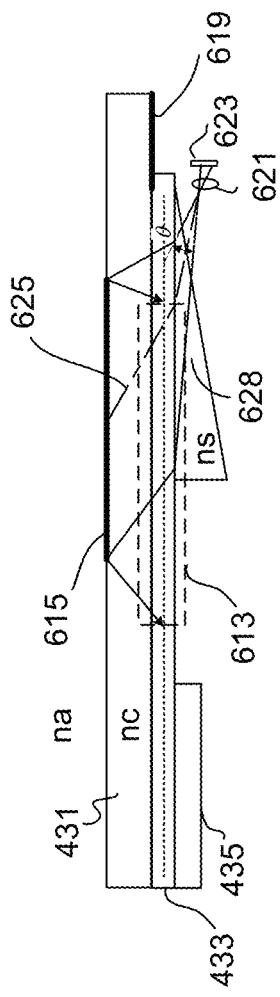
Figure 10B:
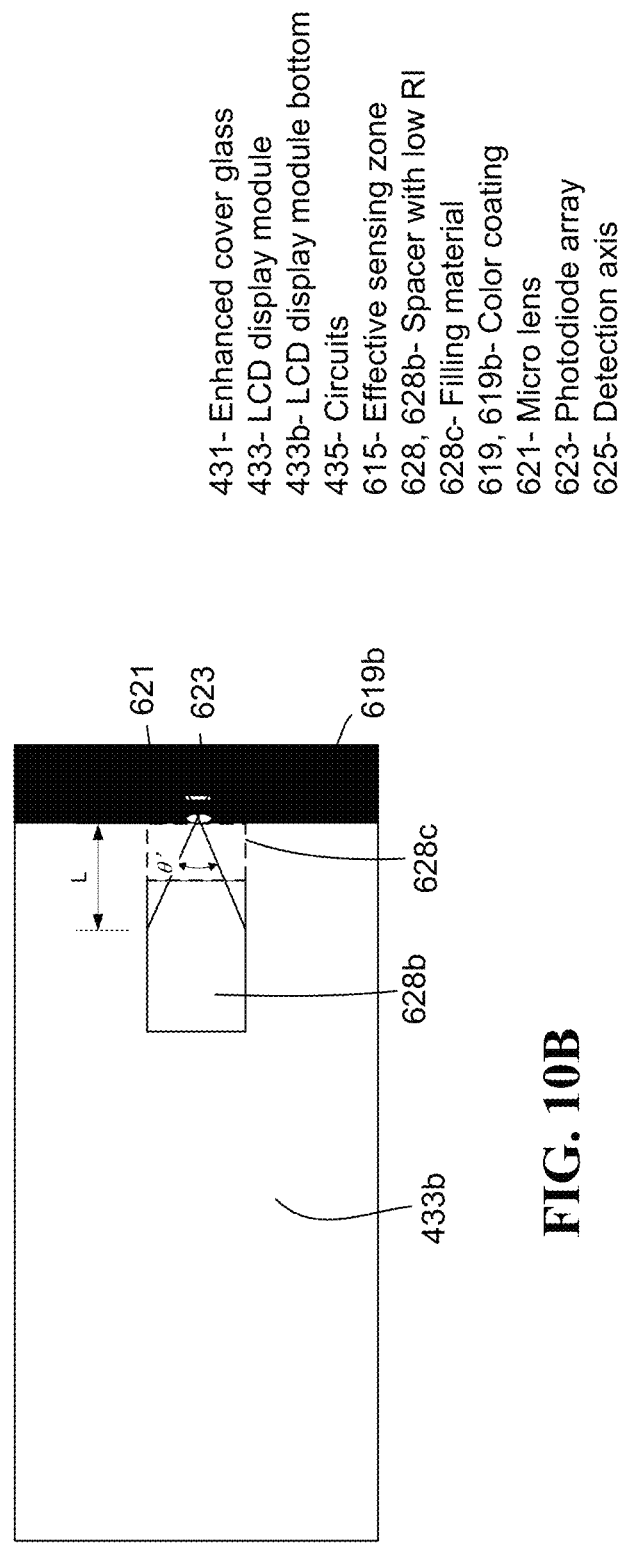

FIGS. 10A-10B show an example of an under-screen optical fingerprint sensor module that uses an optical coupler 628 shaped as a thin wedge to improve the optical detection at the optical sensor array 623. FIG. 10A shows a cross section of the device structure with an under-screen optical fingerprint sensor module for fingerprint sensing and FIG. 10B shows a top view of the device screen. The optical wedge 628 (with a refractive index ns) is located below the display panel structure to modify a total reflection condition on a bottom surface of the display panel structure that interfaces with the optical wedge 628 to permit extraction of light out of the display panel structure through the bottom surface. The optical sensor array 623 receives the light from the optical wedge 628 extracted from the display panel structure and the optical imaging module 621 is located between the optical wedge 628 and the optical sensor array 623 to image the light from the optical wedge 628 onto the optical sensor array 623. In the illustrated example, the optical wedge 628 includes a slanted optical wedge surface facing the optical imaging module and the optical sensing array 623. Also, as shown, there is a free space between the optical wedge 628 and the optical imaging module 621.

If the light is totally reflected at the sensing surface of the cover glass 431, the reflectance is 100%, of the highest efficiency. However, the light will also be totally reflected at the LCD bottom surface 433b if it is parallel to the cover glass surfaces. The wedge coupler 628 is used to modify the local surface angle so that the light can be coupled out for the detection at the optical sensor array 623. The micro holes in the LCD display module 433 provide the desired light propagation path for light to transmit through the LCD display module 433 for the under-screen optical sensing. The actual light transmission efficiency may gradually be reduced if the light transmission angle becomes too large or when the TFT layer becomes too thick. When the angle is close to the total reflection angle, namely about 41.8° when the cover glass refractive index is 1.5, the fingerprint image looks good. Accordingly, the wedge angle of the wedge coupler 628 may be adjusted to be of a couple of degrees so that the detection efficiency can be increased or optimized. If the cover glass' refractive index is selected to be higher, the total reflection angle becomes smaller. For example, if the cover glass is made of Sapphire which refractive index is about 1.76, the total reflection angle is about 34.62°. The detection light transmission efficiency in the display is also improved. Therefore, this design of using a thin wedge to set the detection angle to be higher than the total reflection angle, and/or to use high refractive index cover glass material to improve the detection efficiency.

In some under-screen optical fingerprint sensor module designs (e.g., those illustrated in FIGS. 6A-6C, 7, 8A, 8B, 9, 10A, and 10B), the sensing area 615 on the top transparent surface is not vertical or perpendicular to the detection axis 625 of the optical fingerprint sensor module so that the image plane of the sensing area is also not vertical or perpendicular to the detection axis 625. Accordingly, the plane of the photodetector array 623 can be tilted relative the detection axis 625 to achieve high quality imaging at the photodetector array 623.

Figure 11A:
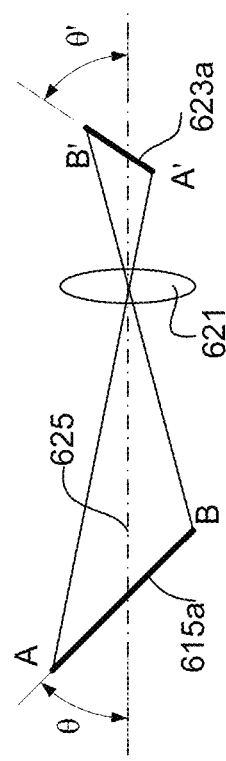
FIGS. 11A-11C illustrate imaging of the fingerprint sensing area on the top cover layer via an imaging module under different tiling conditions where an imaging device images the fingerprint sensing area onto an optical sensor array and the imaging device may be optically transmissive or optically reflective according to some embodiments.
Figure 11B:
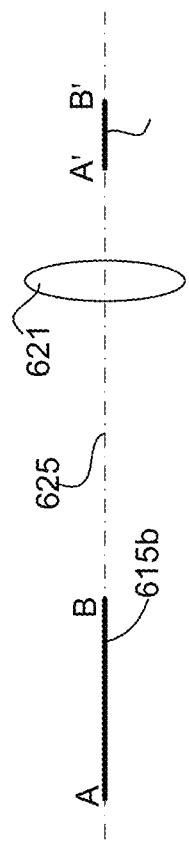
Figure 11C:
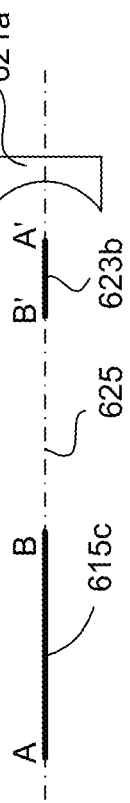

FIGS. 11A-11C show three example configurations for this tilting. FIG. 11A shows the sensing area 615a is tilted and is not perpendicular the detection axis 625. In FIG. 11B, the sensing area 615b is aligned to be on the detection axis 625, such that its image plane will also be located on the detection axis 625. In practice, the lens 621 can be partially cut off so as to simplify the package. In various implementations, the micro lens 621 can also be of transmission type or reflection type. For example, a specified approach is illustrated in FIG. 11C. The sensing area 615c is imaged by an imaging mirror 621a. A photodiode array 623b is aligned to detect the signals.

In the above designs where the lens 621 is used, the lens 621 can be designed to have an effective aperture that is larger than the aperture of the holes in the LCD display layers that allow transmission of light through the LCD display module for optical fingerprint sensing. This design can reduce the undesired influence of the wiring structures and other scattering objects in the LCD display module.

Figure 12:
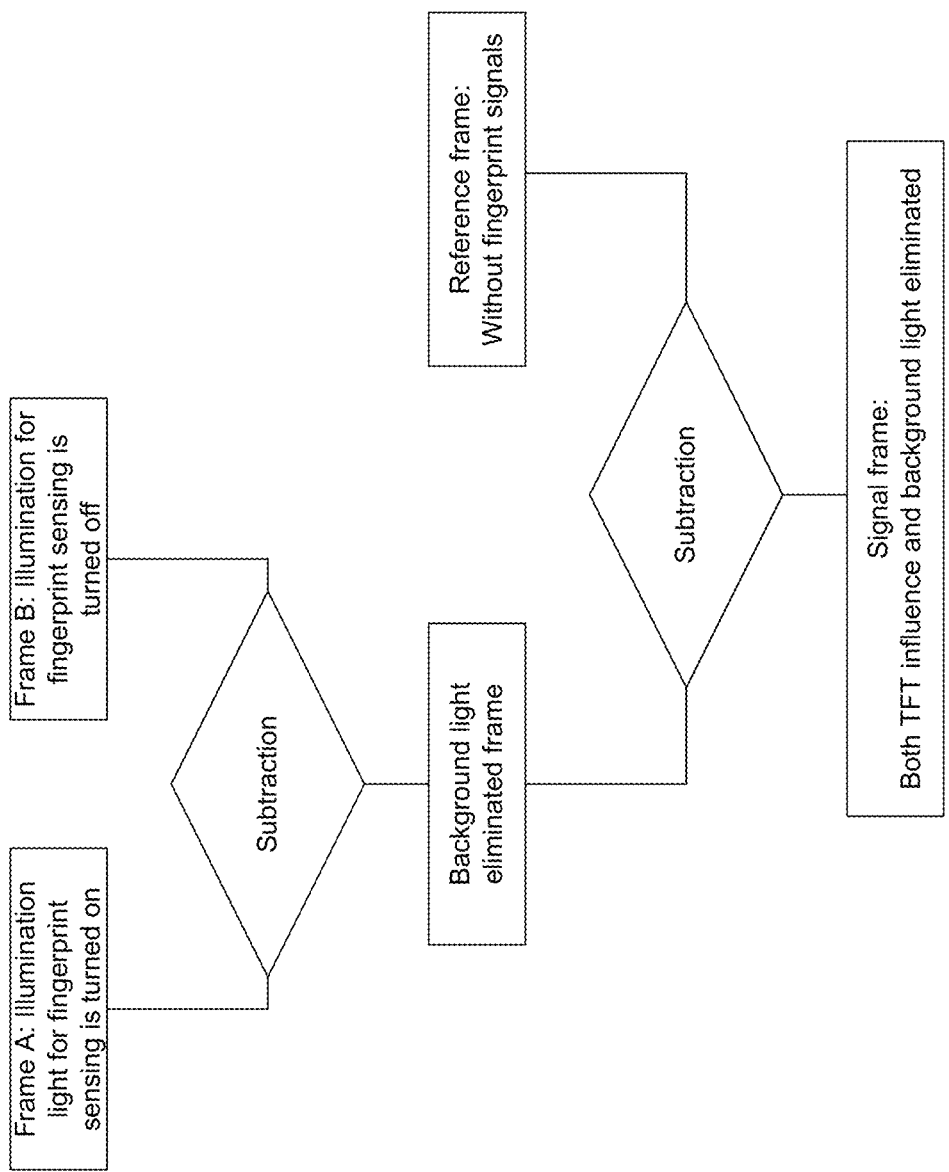
FIG. 12 is a flowchart illustrating an exemplary operation of a fingerprint sensor for reducing or eliminating undesired contributions from the background light in fingerprint sensing according to some embodiments.

FIG. 12 shows an example of an operation of the fingerprint sensor for reducing or eliminating undesired contributions from the background light in fingerprint sensing. The optical sensor array can be used to capture various frames and the captured frames can be used to perform differential and averaging operations among multiple frames to reduce the influence of the background light. For example, in frame A, the illumination light source for optical fingerprint sensing is turned on to illuminate the finger touching area, in frame B the illumination is changed or is turned off. Subtraction of the signals of frame B from the signals of frame A can be used in the image processing to reduce the undesired background light influence.

The undesired background light in the fingerprint sensing may also be reduced by providing proper optical filtering in the light path. One or more optical filters may be used to reject the environment light wavelengths, such as near IR and partial of the red light etc. In some implementation, such optical filter coatings may be made on the surfaces of the optical parts, including the display bottom surface, prism surfaces, sensor surface etc. For example, human fingers absorb most of the energy of the wavelengths under ~580 nm, if one or more optical filters or optical filtering coatings can be designed to reject light in wavelengths from 580 nm to infrared, undesired contributions to the optical detection in fingerprint sensing from the environment light may be greatly reduced.

Figure 13:
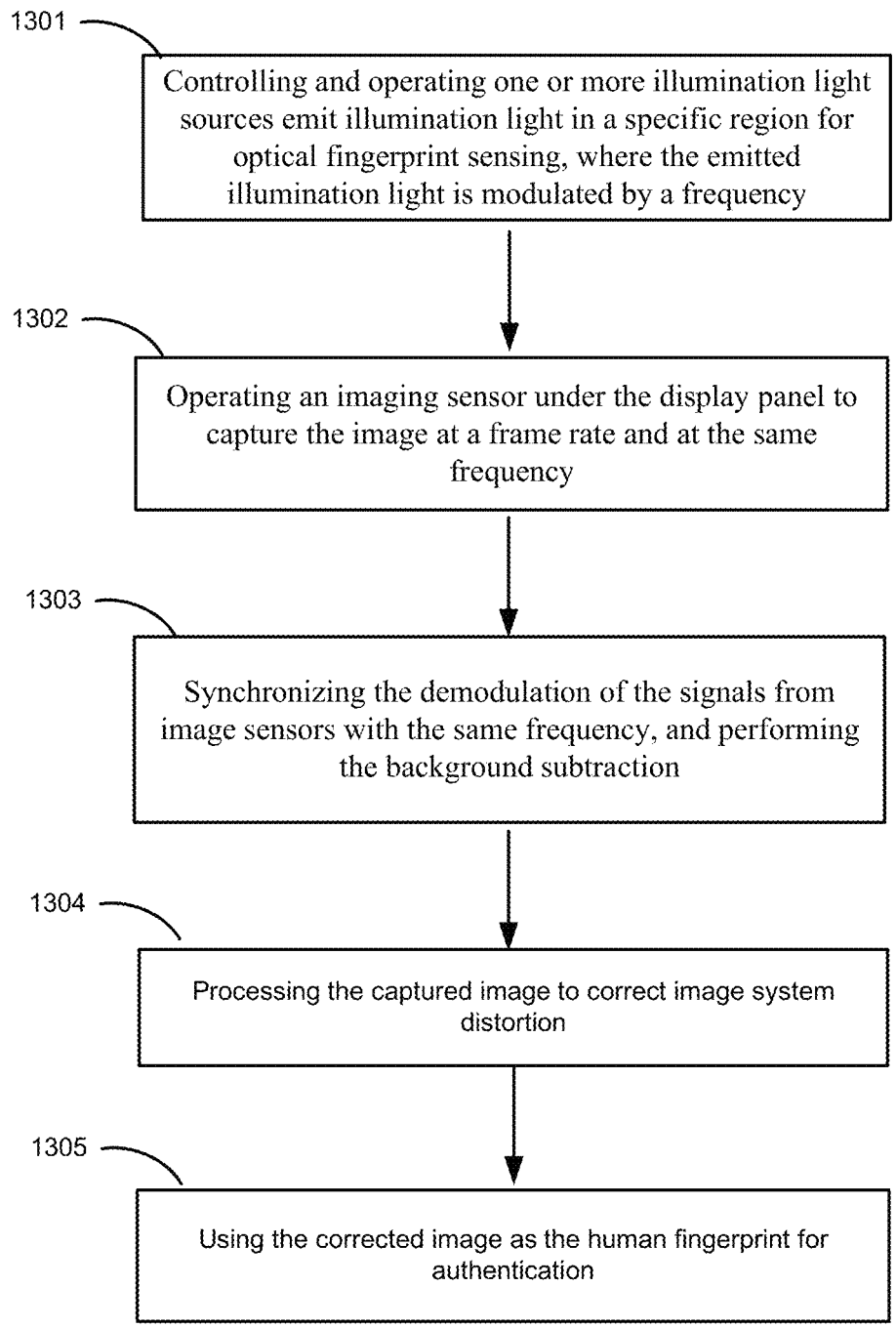
FIG. 13 is a flowchart illustrating an exemplary process for operating an under-screen optical fingerprint sensor module for capturing a fingerprint pattern according to some embodiments.

FIG. 13 shows an example of an operation process for correcting the image distortion in the optical fingerprint sensor module. At step 1301, the one or more illumination light sources are controlled and operated to emit light in a specific region, and the light emission of such pixels is modulated by a frequency F. At step 1302, an imaging sensor under the display panel is operated to capture the image at frame rate at same frequency F. In the optical fingerprint sensing operation, a finger is placed on top of the display panel cover substrate and the presence of the finger modulates the light reflection intensity of the display panel cover substrate top surface. The imaging sensor under the display captures the fingerprint modulated reflection light pattern. At step 1303, the demodulation of the signals from image sensors is synchronized with the frequency F, and the background subtraction is performed. The resultant image has a reduced background light effect and includes images from pixel emitting lights. At step 1304, the capture image is processed and calibrated to correct image system distortions. At step 1305, the corrected image is used as a human fingerprint image for user authentication.

The same optical sensors used for capturing the fingerprint of a user can be used also to capture the scattered light from the illuminated finger as shown by the back scattered light 191 in FIG. 5A. The detector signals from the back scattered light 191 in FIG. 5A in a region of interest can be integrated to produce an intensity signal. The intensity variation of this intensity signal is evaluated to determine other parameters beyond the fingerprint pattern, e.g., the heart rate of the user or inner topological tissues of a finger associated with the external fingerprint pattern.

The above fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device. Hence, a fingerprint pattern, although a unique biometric identifier, may not be by itself a completely reliable or secure identification. The under-screen optical fingerprint sensor module can also be used to as an optical anti-spoofing sensor for sensing whether an input object with fingerprint patterns is a finger from a living person and for determining whether a fingerprint input is a fingerprint spoofing attack. This optical anti-spoofing sensing function can be provided without using a separate optical sensor. The optical anti-spoofing can provide high-speed responses without compromising the overall response speed of the fingerprint sensing operation.

Figure 14:
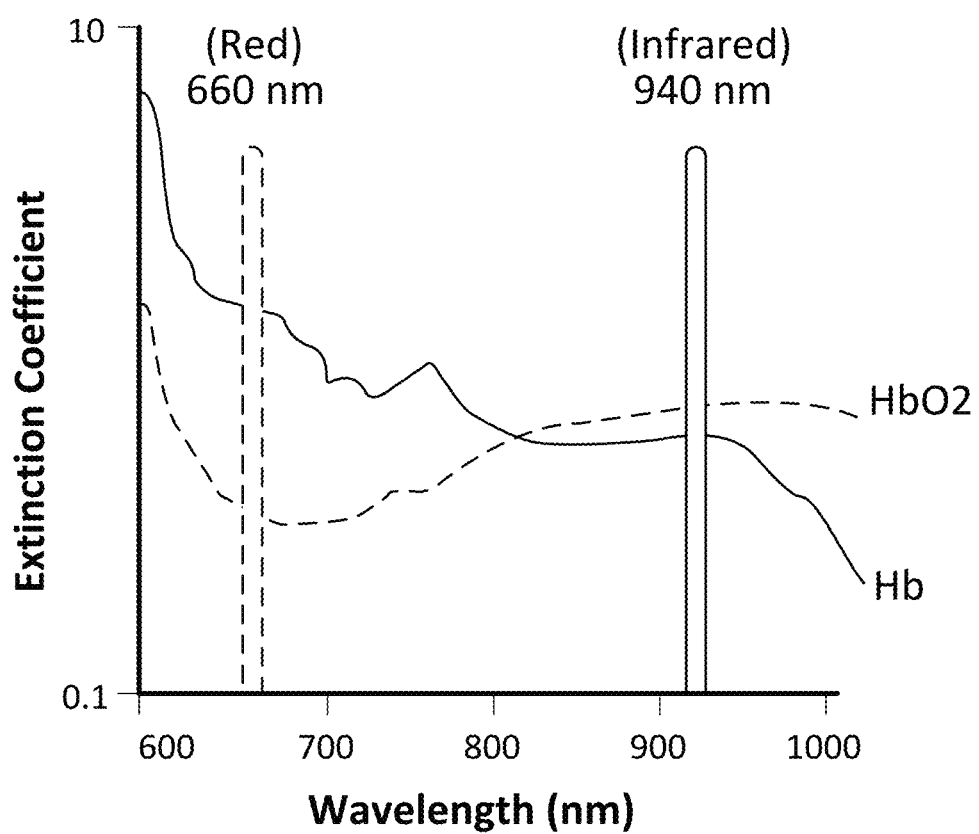
FIGS. 14-16 illustrates exemplary operation processes for determining whether an object in contact with the LCD display screen is part of a finger of a live person by illuminating the finger with light in two different light colors according to some embodiments.

FIG. 14 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a first visible wavelength (Color A) and a second different wavelength such as an infrared (IR) wavelength (Color B), the differences in the optical absorption of the input object can be captured determine whether the touched object is a finger from a live person. The one or more illumination light sources for providing the illumination for optical sensing can be used to emit light of different colors to emit probe or illumination light at least two different optical wavelengths to use the different optical absorption behaviors of the blood for live finger detection. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 15:
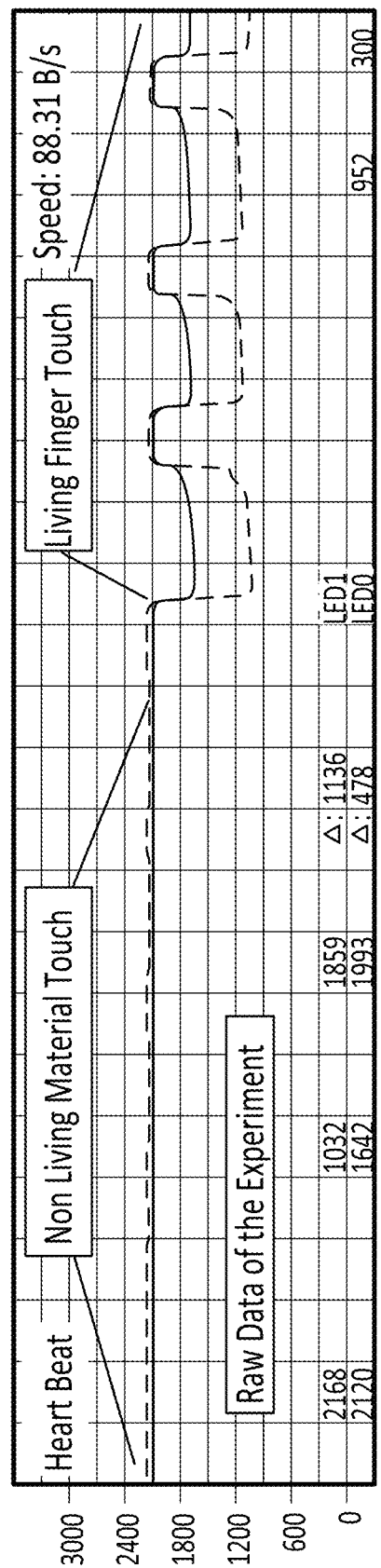

FIG. 15 shows a comparison between optical signal behaviors in the reflected light from a nonliving material (e.g., a fake finger or a spoof device with a fabricated fingerprint pattern) and a live finger. The optical fingerprint sensor can also operate as a heartbeat sensor to monitor a living organism. When two or more wavelengths of the probe light are detected, the extinction ratio difference can be used to quickly determine whether the monitored material is a living organism, such as live fingerprint. In the example shown in FIG. 15, probe light at different wavelengths were used, one at a visible wavelength and another at an IR wavelength as illustrated in FIG. 14.

When a nonliving material touches the top cover glass above the fingerprint sensor module, the received signal reveals strength levels that are correlated to the surface pattern of the nonliving material and the received signal does not contain signal components associated with a finger of a living person. However, when a finger of a living person touches the top cover glass, the received signal reveals signal characteristics associated with a living person, including obviously different strength levels because the extinction ratios are different for different wavelengths. This method does not take long time to determine whether the touching material is a part of a living person. In FIG. 15, the pulse-shaped signal reflects multiple touches instead of blood pulse. Similar multiple touches with a nonliving material does not show the difference caused by a living finger.

This optical sensing of different optical absorption behaviors of the blood at different optical wavelengths can be performed in a short period for live finger detection and can be faster than optical detection of a person's heart beat using the same optical sensor.

In LCD displays, the LCD backlighting illumination light is white light and thus contains light at both the visible and IR spectral ranges for performing the above live finger detection at the optical fingerprint sensor module. The LCD color filters in the LCD display module can be used to allow the optical fingerprint sensor module to obtain measurements in FIGS. 14 and 15. In addition, the designated light sources 436 for producing the illumination light for optical sensing can be operated to emit probe light at the selected visible wavelength and IR wavelength at different times and the reflected probe light at the two different wavelengths is captured by the optical detector array 623 to determine whether touched object is a live finger based on the above operations shown in FIGS. 14 and 15. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Figure 16:
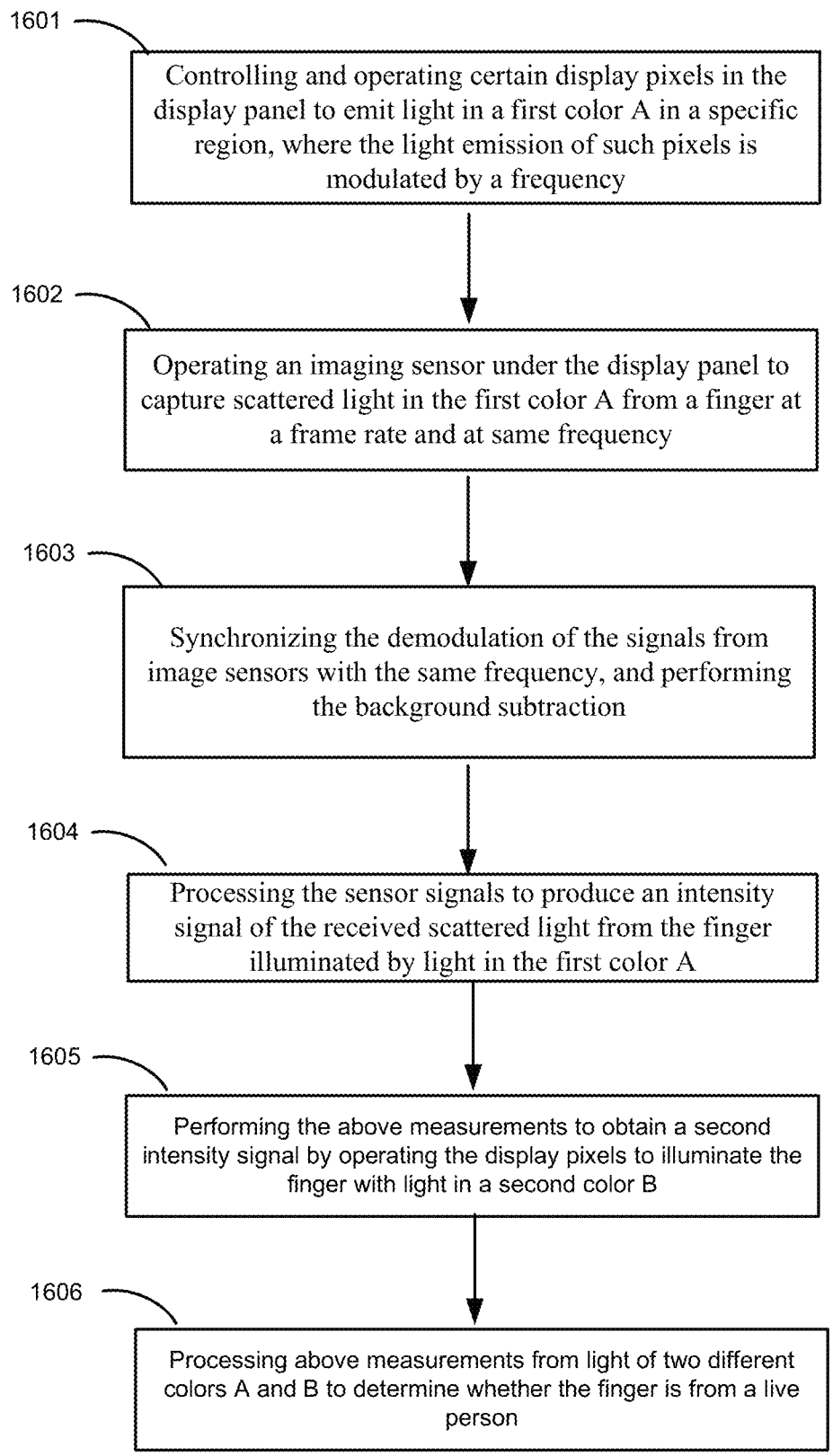

FIG. 16 shows an example of an operation process for determining whether an object in contact with the LCD display screen is part of a finger of a live person by operating the one or more illumination light sources for optical sensing to illuminate the finger with light in two different light colors.

For yet another example, the disclosed optical sensor technology can be used to detect whether the captured or detected pattern of a fingerprint or palm is from a live person's hand by a "live finger" detection mechanism by other mechanisms other than the above described different optical absorptions of blood at different optical wavelengths. For example, a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

In the above examples where the fingerprint pattern is captured on the optical sensor array via an imaging module, as in FIG. 4B and FIG. 6B, optical distortions tend to degrade the image sensing fidelity. Such optical distortions can be corrected in various ways. For example, a known pattern can be used to generate an optical image at the optical sensor array and the image coordinates in the know pattern can be correlated to the generated optical image with distortions at the optical sensor array for calibrating the imaging sensing signals output by the optical sensor array for fingerprint sensing. The fingerprint sensing module calibrates the output coordinates referencing on the image of the standard pattern.

In light of the disclosure in this patent document, various implementations can be made for the optical fingerprint sensor module as disclosed. For example, a display panel can be constructed in which each pixel emitting lights, and can be controlled individually; the display panel includes an at least partially transparent substrate; and a cover substrate, which is substantially transparent. An optical fingerprint sensor module is placed under the display panel to sense the images form on the top of the display panel surface. The optical fingerprint sensor module can be used to sense the images form from light emitting from display panel pixels. The optical fingerprint sensor module can include a transparent block with refractive index lower than the display panel substrate, and an imaging sensor block with an imaging sensor array and an optical imaging lens. In some implementations, the low refractive index block has refractive index in the range of 1.35 to 1.46 or 1 to 1.35.

For another example, a method can be provided for fingerprint sensing, where light emitting from a display panel is reflected off the cover substrate, a finger placed on top of the cover substrate interacts with the light to modulate the light reflection pattern by the fingerprint. An imaging sensing module under the display panel is used to sense the reflected light pattern image and reconstruct fingerprint image. In one implementation, the emitting light from the display panel is modulated in time domain, and the imaging sensor is synchronized with the modulation of the emitting pixels, where a demodulation process will reject most of the background light (light not from pixels being targeted).

III. Under-Display Illumination with External Light Sources

As described above, display screens of portable electronic devices are often implemented as an assembly of multiple layers. For example, display screens implemented as touchscreens can include display layers for outputting video data, capacitive touchscreen layers for detecting touch events, a hard top layer, etc. Additional layers are used to integrate under-display optical sensing capabilities, such as fingerprint sensing.

Figure 17A:
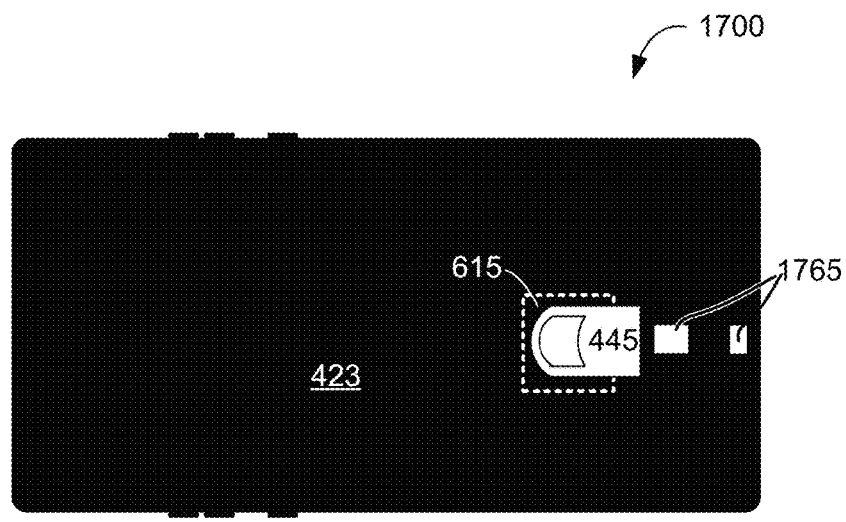
FIGS. 17A and 17B show an illustrative portable electronic device, and a cross-section of an illustrative display module for such a portable electronic device, respectively, according to various embodiments.
Figure 17B:
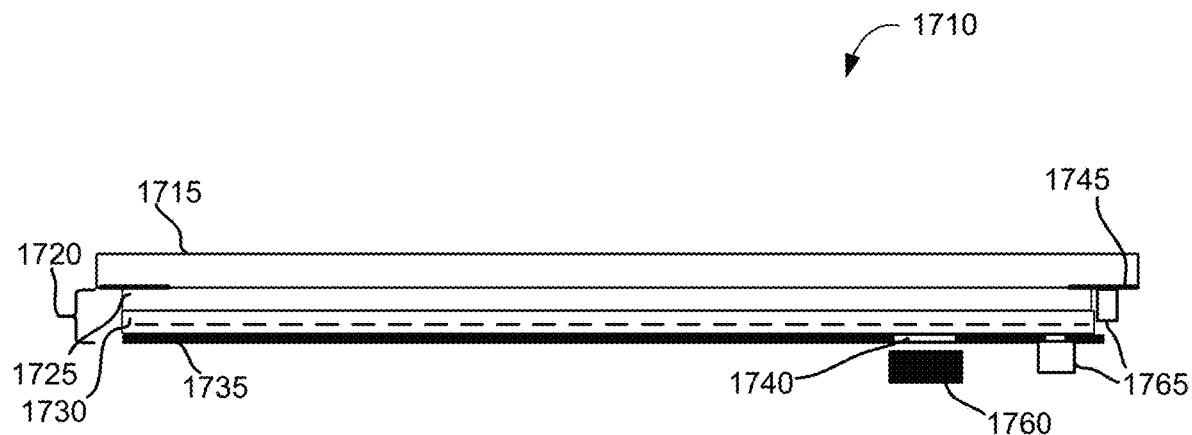

FIGS. 17A and 17B show an illustrative portable electronic device 1700, and a cross-section of an illustrative display module 1710 for such a portable electronic device 1700, respectively, according to various embodiments. The portable electronic device 1700 is illustrated as a smart phone. In other implementations, the portable electronic device 1700 is a laptop computer, a tablet computer, a wearable device, or any other suitable computational platform. The portable electronic device 1700 can include a display system 423. As described above, the display system 423 can be a touch sensing display system 423. The display system 423 has, integrated therein, an under-display optical sensor (illustrated by optical sensing module 1760). As illustrated, the under-display optical sensor can define a sensing region 615, within which optical sensing can be performed. For example, fingerprint scanning can be performed by the optical sensing module 1760 when a user places a finger 445 on the display within the sensing region 615.

The display module 1710 of FIG. 17B can be an implementation of the display system 423 of FIG. 17A. As illustrated, the display module 1710 includes a number of layers. A top cover layer 1715 (e.g., glass) can serve as a user interface surface for various user interfacing operations. For example, the cover layer 1715 can facilitate touch sensing operations by the user, displaying images to the user, an optical sensing interface to receive a finger for optical fingerprint sensing and other optical sensing operations, etc. In some embodiments, the display module 1710 includes the cover layer 1715. In other implementations, the cover layer 1715 is separate from the display module 1710. For example, the display module 1710 is integrated into the portable electronic device 1700 as a module, and the cover layer 1715 is installed on top of the display module 1710. In some implementations, the top cover layer 1715 includes a dark coating 1745.

One or more other layers of the display module 1710 form a liquid crystal module (LCM) 1720. The LCM 1720 can include various internal layers to support various functions. As illustrated, the LCM 1720 can include touch sensor layers 1725 and display pixel layer 1730. The display pixel layer 1730 are comprised of a network of pixels interconnected by electrodes. For example, in a liquid crystal display, the pixels are implemented by rotating liquid crystals to rotate polarized light. Though described as a LCM 1720, the display pixel layer 1730 can be implemented using any other suitable type of pixel implementation.

The display module 1710 can also include one or more additional material layers 1735. The material layers 1735 can include one or more enhancement layers (e.g., with one or more layers of brightness-enhancement film), light diffuser layers, light guide plates, reflector films, and/or other layers. Embodiments of the material layers 1735 can be designed to provide a sensor receiving light path window 1740. For example, the enhancement layers and/or diffuser layers can be designed to provide enhancement and/or diffusion of under-display lighting when the light travels in the direction of the top cover layer 1715, but to provide a relatively transparent viewing window for light traveling in the direction of the optical sensing module 1760. In some implementations, when LCD cells (e.g., in the sensing region 615) are turned on, the LCM 1720 (e.g., the LC cells, electrodes, transparent ITO, polarizer, color filter, touch sensing layer, etc.) can become partially transparent, although the micro structure (e.g., pixels and electrodes) may interfere and/or block some light energy. Embodiments of the light diffuser, the light guide plate, the reflector film, etc. can be treated to hold the optical sensing module 1760 and provide the sensor receiving light path window 1740 (i.e., a transparent or partially transparent sensing light path), so that a portion of the reflected light from the top surface of the cover layer 1715 can reach sensing elements (e.g., a photo detector array) of the optical sensing module 1760. The optical sensing module 1760 can include any suitable components, such as fingerprint sensor parts, a photodetector array, an optical collimator array for collimating and directing reflected probe light to the photo detector array, and an optical sensor circuit to receive and condition detector output signals from the photo detector array. Embodiments of the photodetector array include a CMOS sensor of CMOS sensing pixels, a CCD sensor array, or any other suitable optical sensor array. In some implementations, the display module 1710 includes additional features that are not shown, such as a frame. In some implementations, the frame is configured to help hold the optical sensing module 1760.

Embodiments of the display module 1710 also include one or more external light sources 1765. The external light sources 1765 can be used to support various under-display illumination functions, such as backlighting and/or probe lighting to support sensing by the optical sensing module 1760. Various light sources can be used for the under-display lighting, such as light emitting diodes (LEDs), organic LEDs (OLEDs), active-matrix OLED (AMOLED), vertical cavity surface-emitting lasers (VCSELs), etc. As described above, for light to travel between the top cover layer 1715 and the optical sensing module 1760, the light passes through the various layers of the display module 1710. Some layers are designed to permit transmission of the light, such as to enhance, bend, focus, collimate, reflect, and/or otherwise influence transmission of light through the layers.

In conventional implementations of display modules 1710, micro-structures of display pixel layer 1730 can interfere with transmission of light from the external light sources 1765. For example, the pixels are typically spaced very close together and can each typically consume on the order of 50 microns, such that the pixels of the display pixel layer 1730 can appreciably interfere with transmission of light through the display pixel layer 1730, thereby appreciably reducing the illumination efficiency of the external light sources 1765. Further, as the light from the external light sources 1765 shines directly onto the pixels of the display pixel layer 1730, the pixels can become damaged. For example, some typical smartphone displays are implemented using thin-film transistor (TFT) liquid crystal display technology. Light shining on the TFTs can tend to oversaturate the transistors, which can tend to damage the TFTs over time.

Various embodiments described herein seek to improve performance of under-display lighting provided by the external light sources 1765. For example, embodiments seek to mitigate loss of illumination efficiency caused conventionally by interference of micro-structures of the display pixel layer 1730 with light energy from the external light sources 1765, and/or to mitigate damage to such micro-structures caused conventionally by light energy from the external light sources 1765. The embodiments include external light sources 1765 configured to effectively pass light from below the display to above the display while avoiding interaction with some or all of the micro-structures of the display pixel layer 1730 of the display module 1710.

Figure 18A:
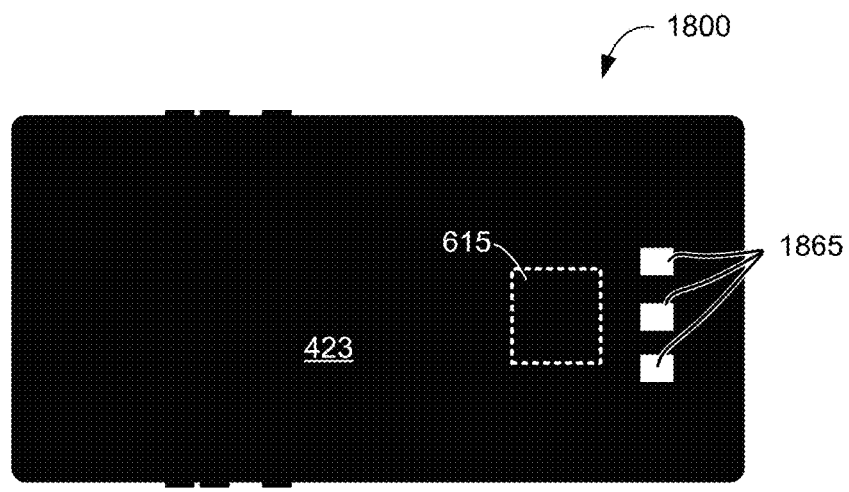
FIGS. 18A-18C show a first illustrative approach to under-display illumination with external light sources, according to various embodiments.
Figure 18B:
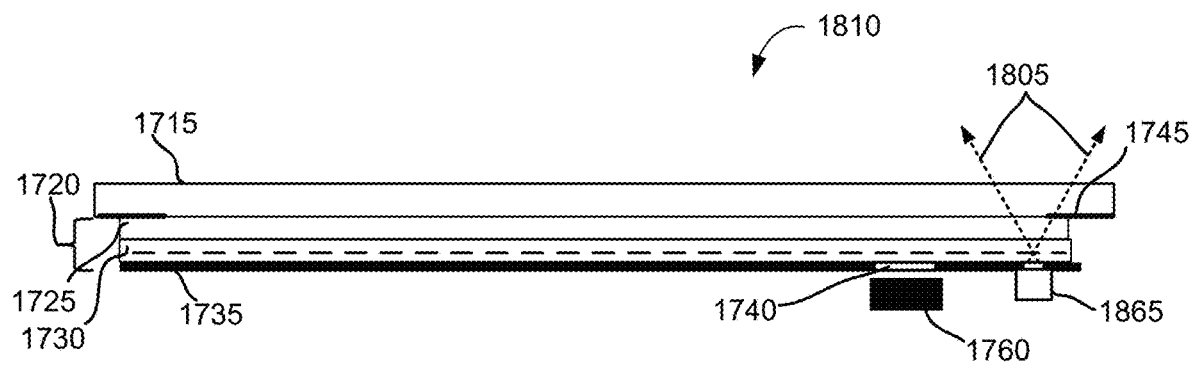
Figure 18C:
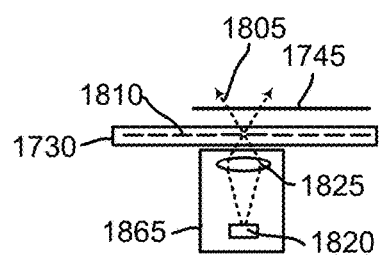

FIGS. 18A-18C show a first illustrative approach to under-display illumination with external light sources 1865, according to various embodiments. Turning first to FIG. 18A, a portion of a portable electronic device 1800 is shown as including a display system 423 (e.g., a touch sensing display system with an integrated under-display optical sensing module 1760 (shown in FIG. 18B) and one or more external light sources 1865. As illustrated, the under-display optical sensor can define a sensing region 615, within which optical sensing can be performed. The one or more external light sources 1865 can be positioned under the display to provide under-display lighting (e.g., backlighting and/or probe lighting).

FIG. 18B shows a cross-section of a portion of a display module 1810, which can correspond to a portion of the display system 423 of FIG. 18A. As illustrated, the display module 1810 includes a number of layers, including a top cover layer 1715, a liquid crystal module (LCM) 1720, and an under-display optical sensing module 1760. The LCM 1720 can include touch sensor layers 1725, display pixel layer 1730, and one or more additional material layers 1735 (e.g., enhancement layers, light diffuser layers, light guide plates, reflector films, and/or other layers). As described above, embodiments of the material layers 1735 can be designed to provide a sensor receiving light path window 1740. The optical sensing module 1760 can include any suitable components, such as fingerprint sensor parts, a photodetector array, an optical collimator array for collimating and directing reflected probe light to the photo detector array, and an optical sensor circuit to receive and condition detector output signals from the photo detector array.

As illustrated, embodiments of the display module 1710 also include one or more external light sources 1865, which can support various under-display illumination functions, such as backlighting and/or probe lighting to support sensing by the optical sensing module 1760. In some implementations, the external light sources 1865 is implemented as a single external light source 1865. In other implementations, the external light sources 1865 include two or more external light sources 1865. In some such implementations, the two or more external light sources 1865 each have substantially the same optical characteristics (e.g., a same polarization, modulation, frequency, etc.). In other such implementations, the two or more external light sources 1865 each have one or more differences in optical characteristics (e.g., different polarization, modulation, frequency, and/or other characteristic). The external light sources 1865 are disposed below the display pixel layer 1730 of the display module 1710. As described above, in such a configuration, light energy from the external light sources 1865 can be absorbed by micro-structures of the display pixel layer 1730 (e.g., the pixels and electrodes). Such absorption can appreciably reduce the efficiency of the under-display illumination and/or can cause damage to the micro-structures (e.g., to TFTs of the pixels).

FIG. 18C shows a close-up view of an illustrative operation of an external light source 1865 of the one or more external light sources 1865. The external light source 1865 can include an illumination device 1820 and a lens 1825. The illumination 1820 can be implemented as a LED, OLED, AMOLED, VCSEL, etc. As described above, for light energy to go from the illumination device 1820 to the top cover layer 1715, the light interacts with the various layers of the display module 1710, including with the display pixel layer 1730. As illustrated, the light from the illumination device 1820 is divergent. Such divergence can be desirable to support under-display illumination features. However, such divergence can also lead to undesirable interaction between the light energy the display pixel layer 1730. The display pixel layer 115 are comprised of a network of pixels interconnected by electrodes. For example, in a liquid crystal display, the pixels are implemented by rotating liquid crystals to rotate polarized light. A typical display pixel layer 1730 for a smartphone application may include a network of micro-structures 1810, including tightly spaced pixels interconnected by electrodes. Each pixels may typically have a diameter on the order of 50 microns and may be spaced with gaps of less than ten microns. The divergent light from the illumination device 1820 tends to be blocked (e.g., absorbed, reflected, etc.) by these micro-structures 1810, such that only a small amount of the light energy (e.g., around 3 percent in some cases) tends to pass through the display pixel layer 1730.

Embodiments of the external light source 1865 include a lens 1825 to cause the divergent light from the illumination device 1820 to converge substantially at the location of a space between the micro-structures 1810. The lens 1825 is a convex lens positioned at a distance from the micro-structures 1810, such that the focal point of the lens 1825 is substantially at the micro-structures 1810; and the lens 1825 is further positioned and/or oriented with respect to the micro-structures 1810, such that the focal point substantially in a gap between the micro-structures 1810. As such, most or all of the light energy from the illumination device 1820 tends to pass through the gap in the micro-structures 1810, thereby avoiding being blocked by the micro-structures 1810 and/or damaging the micro-structures 1810. Stated differently, the lens 1825 produces an image of the external light source 1865 on a plane of display pixel layer 1730 (substantially in a plane of the micro-structures 1810), such that the image is smaller than a gap size of the display pixel layer 1730. Further, after the light converges at the focal point, the light again diverges as it continues to travel in the direction of the top surface of the cover layer 1715 (as illustrated by light beams 1805 of FIG. 18B). Effectively, the lens 1825 produces a second image of the external light source 1865 on a plane of cover layer 1715 (e.g., at the top surface), such that the image is appreciably larger than the gap size of the display pixel layer 1730.

In some implementations, the cover layer 1715 includes a dark coating 1745. For example, some or all of a bottom surface of the cover layer 1715 includes a dark layer 1745. In some implementations, as shown in FIG. 18C, some or all of the light passing through the micro-structures 1810 interacts with the dark layer 1745. In some such implementations, the illumination device 1820 generates light with particular optical characteristics (e.g., at a particular polarization and/or frequency) so as to fully or partially pass through the dark coating 1745. In other such implementations, the dark layer 1745 is treated to be fully or partially transparent to light with particular optical characteristics (e.g., at a particular polarization and/or frequency), as generated by the illumination device 1820.

Figure 19A:
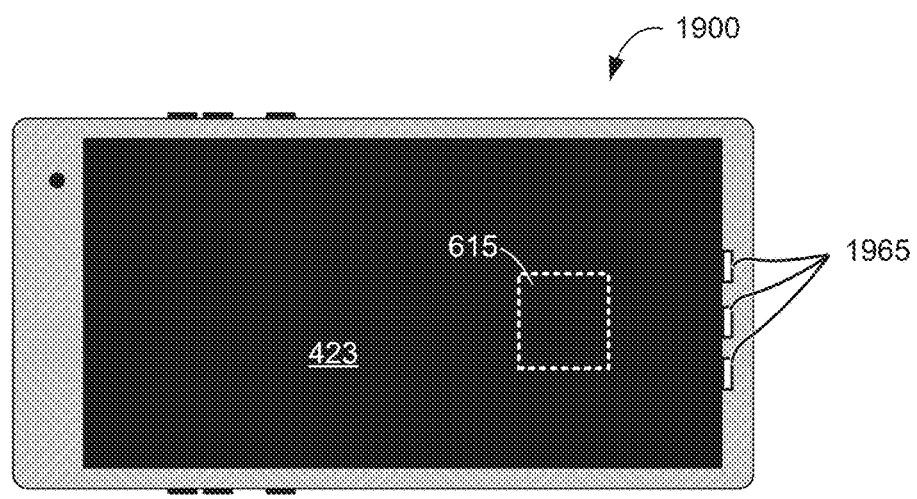
FIGS. 19A and 19B show a second illustrative approach to under-display illumination with external light sources, according to various embodiments.
Figure 19B:
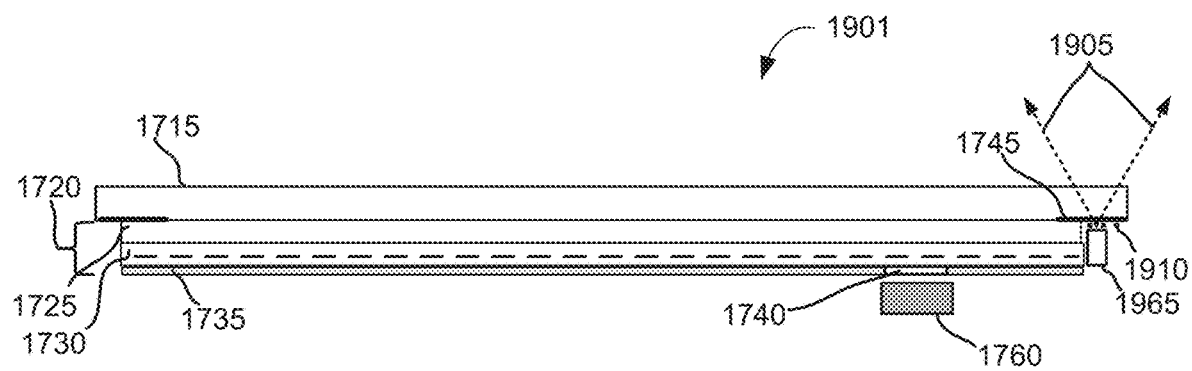

FIGS. 19A and 19B show a second illustrative approach to under-display illumination with external light sources 1965, according to various embodiments. Turning first to FIG. 19A, a portion of a portable electronic device 1900 is shown as including a display system 423 (e.g., a touch sensing display system with an integrated under-display optical sensing module 1760 (shown in FIG. 19B) and one or more external light sources 1965. As illustrated, the under-display optical sensor can define a sensing region 615, within which optical sensing can be performed. As in FIGS. 18A-18C, one or more external light sources 1965 can be positioned under the display to provide under-display lighting (e.g., backlighting and/or probe lighting). However, while external light sources 1865 (in FIGS. 18A-18C) are positioned under the display pixel layers 1730 of the display module 1710, the external light sources 1965 (in FIGS. 19A and 19B) are positioned in the edge area of the top cover layer 1715 of the display module 1710.

FIG. 19B shows a cross-section of a portion of a display module 1901, which can correspond to a portion of the display system 423 of FIG. 19A. As illustrated, the display module 1901 includes a number of layers, including a top cover layer 1715, a liquid crystal module (LCM) 1720, and an under-display optical sensing module 1760. The LCM 1720 can include touch sensor layers 1725, display pixel layer 1730, and one or more additional material layers 1735. As described above, embodiments of the material layers 1735 can be designed to provide a sensor receiving light path window 1740. The optical sensing module 1760 can include any suitable components, such as fingerprint sensor parts, a photodetector array, an optical collimator array for collimating and directing reflected probe light to the photo detector array, and an optical sensor circuit to receive and condition detector output signals from the photo detector array.

As illustrated, embodiments of the display module 1710 also include one or more external light sources 1965, which can support various under-display illumination functions, such as backlighting and/or probe lighting to support sensing by the optical sensing module 1760. In some implementations, the external light sources 1965 is implemented as a single external light source 1965. In other implementations, the external light sources 1965 include two or more external light sources 1965. In some such implementations, the two or more external light sources 1965 each have substantially the same optical characteristics (e.g., a same polarization, modulation, frequency, etc.). In other such implementations, the two or more external light sources 1965 each have one or more differences in optical characteristics (e.g., different polarization, modulation, frequency, and/or other characteristic).

The external light sources 1965 are disposed in the edge area of the top cover layer 1715 of the display module 1710. The edge area can include a number of micro-structures 1910, including edge electrodes to electrically couple the display pixel layer 1730 and/or the touch sensor layers 1725 of the display module 1710 with other components, such as power components, processor components, etc. Within the display pixel layer 1730, each pixel tends to be coupled with multiple electrodes, such that gaps between the micro-structures of the display pixel layer 1730 tend to be very small (e.g., five microns). However, at the edge region of the top cover layer 1715, the electrodes tend to be spaced further apart. For example, there may only be on the order of one electrode per row of pixels, such that there can be a gap on the order of fifty microns or more between electrodes in the edge area.

As illustrated, the external light sources 1965 can be positioned to aim its light energy between the micro-structure 1910 gaps in the edge area. As described above, it is desirable for the light beams 1905 originating from the external light sources 1965 to be divergent. By placing the external light sources 1965 close to the edge area, the light beams 1905 originating therefrom can pass through the relatively large micro-structure 1910 gaps prior to appreciable divergence. As such, the light beams 1905 can pass through the micro-structure 1910 gaps and under-illuminate the display area without being blocked by, and without damaging, the micro-structures of the display module 1710 (e.g., the micro-structures 1910 shown in FIG. 19B, the micro-structures 1810 shown in FIG. 18C, etc.).

In some implementations, the cover layer 1715 includes a dark coating 1745. For example, some or all of a bottom surface of the cover layer 1715 includes a dark layer 1745. In some implementations, as shown in FIG. 19B, some or all of the light passing through the micro-structures 1910 interacts with the dark layer 1745. In some such implementations, the external light sources 1965 can generate light with particular optical characteristics (e.g., at a particular polarization and/or frequency) so as to fully or partially pass through the dark coating 1745. In other such implementations, the dark layer 1745 is treated to be fully or partially transparent to light with particular optical characteristics (e.g., at a particular polarization and/or frequency), as generated by the external light sources 1965.

Figure 20A:
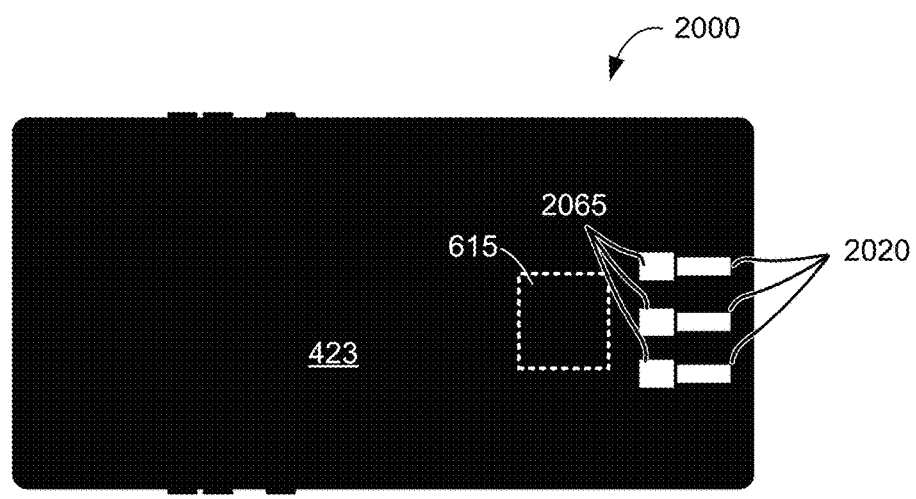
FIGS. 20A and 20B show a third illustrative approach to under-display illumination with external light sources, according to various embodiments.
Figure 20B:
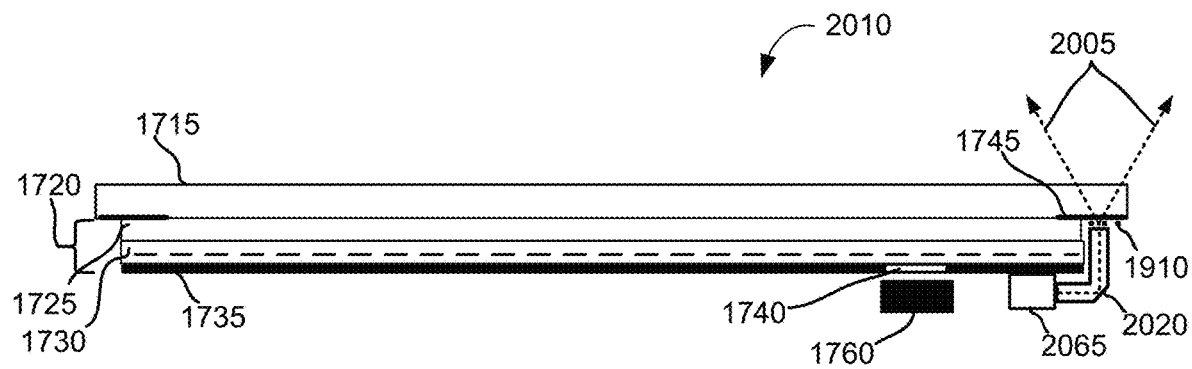

FIGS. 20A and 20B show a third illustrative approach to under-display illumination with external light sources 2065, according to various embodiments. Turning first to FIG. 20A, a portion of a portable electronic device 2000 is shown as including a display system 423 (e.g., a touch sensing display system with an integrated under-display optical sensing module 1760 (shown in FIG. 20B) and one or more external light sources 2065. As illustrated, the under-display optical sensor can define a sensing region 615, within which optical sensing can be performed. As in FIGS. 18A-19B, one or more external light sources 2065 can be positioned under the display to provide under-display lighting (e.g., backlighting and/or probe lighting). However, while external light sources 1865 (in FIGS. 18A-18C) are positioned under and focused through the display pixel layers 1730 of the display module 1710, and the external light sources 2065 (in FIGS. 19A and 19B) are positioned under and focused through the edge area of the top cover layer 1715 of the display module 1710; the external light sources 2065 (in FIGS. 20A and 20B) are positioned under the display pixel layers 1730 and focused through the edge area of the top cover layer 1715 using light guide structures 2020.

FIG. 20B shows a cross-section of a portion of a display module 2010, which can correspond to a portion of the display system 423 of FIG. 20A. As illustrated, the display module 2010 includes a number of layers, including a top cover layer 1715, a liquid crystal module (LCM) 1720, and an under-display optical sensing module 1760. The LCM 1720 can include touch sensor layers 1725, display pixel layer 1730, and one or more additional material layers 1735. As described above, embodiments of the material layers 1735 can be designed to provide a sensor receiving light path window 1740. The optical sensing module 1760 can include any suitable components, such as fingerprint sensor parts, a photodetector array, an optical collimator array for collimating and directing reflected probe light to the photo detector array, and an optical sensor circuit to receive and condition detector output signals from the photo detector array.

As illustrated, embodiments of the display module 1710 also include one or more external light sources 2065, which can support various under-display illumination functions, such as backlighting and/or probe lighting to support sensing by the optical sensing module 1760. In some implementations, the external light sources 2065 is implemented as a single external light source 2065. In other implementations, the external light sources 2065 include two or more external light sources 2065. In some such implementations, the two or more external light sources 2065 each have substantially the same optical characteristics (e.g., a same polarization, modulation, frequency, etc.). In other such implementations, the two or more external light sources 2065 each have one or more differences in optical characteristics (e.g., different polarization, modulation, frequency, and/or other characteristic).

The external light sources 2065 can be positioned and oriented in any suitable position and/or orientation. In some implementations, the external light sources 2065 are positioned under the display pixel layers 1730 of the display module 1710 and oriented sideways (i.e., in a direction orthogonal to that of the display pixel layers 1730). The external light sources 2065 are coupled with one or more light guide structures 2020 configured to direct the light output from the external light sources 2065 to any suitable projection location. Different types of coupling can be used depending on the type of external light sources 2065 and the type of light guide structures 2020. In one implementation, the external light sources 2065 are implemented using LEDs, and lens coupling structures are used to couple the LEDs with the light guide structures 2020. In another implementation, the external light sources 2065 are implemented using VCSELs, and the VCSELs are coupled directly with the light guide structures 2020 without additional lenses or other components. In some embodiments, the light guide structures 2020 are implemented with optical fibers. In other embodiments, the light guide structures 2020 are implemented with mirrors and/or lenses.

As described with reference to FIGS. 19A and 19B, the edge area can include a number of micro-structures 1910, including edge electrodes to electrically couple the display pixel layer 1730 and/or the touch sensor layers 1725 of the display module 1710 with other components, such as power components, processor components, etc.; and those micro-structure 1910 gaps tend to be appreciably larger than those of the display pixel layer 1730. As such, in some embodiments, the light guide structures 2020 are configured to direct the light output from the external light sources 2065 to the edge area of the top cover layer 1715. In such embodiments, the external light sources 2065 can be positioned to aim their light energy between the micro-structure 1910 gaps in the edge area. As described above, it is desirable for the light beams 2005 originating from the external light sources 2065 to be divergent. By placing the external light sources 2065 close to the edge area, the light beams 2005 originating therefrom can pass through the relatively large micro-structure 1910 gaps prior to appreciable divergence. As such, the light beams 2005 can pass through the micro-structure 1910 gaps and under-illuminate the display area without being blocked by, and without damaging, the micro-structures of the display module 1710. Effectively, the light guide structures 2020 produce an image of the external light source 2065 on a plane substantially corresponding to the location of the micro-structures 1910 of the edge area of the top cover layer 1715, such that the image is smaller than a gap size of the micro-structures 1910. In some implementations, the image at the output of the light guide structures 2020 is substantially the same size as at the output of the external light sources 2065. In other implementations, the image at the output of the light guide structures 2020 is slightly larger or smaller than at the output of the external light sources 2065 (e.g., where the light guide structures 2020 include mirrors, lenses, etc.). As illustrated, the light exiting the light guide structures 2020 can tend to diverge as it continues to travel through the cover layer 1715.

In some implementations, the cover layer 1715 includes a dark coating 1745. For example, some or all of a bottom surface of the cover layer 1715 includes a dark layer 1745. In some implementations, as shown in FIG. 20B, some or all of the light passing through the micro-structures 1910 interacts with the dark layer 1745. In some such implementations, the external light sources 2065 can generate light with particular optical characteristics (e.g., at a particular polarization and/or frequency) so as to fully or partially pass through the dark coating 1745. In other such implementations, the dark layer 1745 is treated to be fully or partially transparent to light with particular optical characteristics (e.g., at a particular polarization and/or frequency), as generated by the external light sources 2065. In some embodiments, the light guide structures 2020 include components to condition the light for passage through the dark layer 1745. For example, the light guide structures 2020 include components to modulate, polarize, and/or otherwise condition the light.

FIGS. 17A-20B above show embodiments of electronic devices to provide such features. Each of the illustrated embodiments, and other embodiments, can include at least the display module 1710, the top cover layer 1715, and an under-display lighting module. The display module 1710 includes at least the display pixel layer 1730 having display micro-structures with micro-structure gaps there-between. For example, the display module 1710 includes a liquid crystal display (LCD) panel, and the display micro-structures include liquid crystal structures interconnected by electrodes to output images for display. The top cover layer 715 is disposed above the display module 1710 to provide an output interface for displaying images generated by the display pixel layer 1730. For example, the top cover layer 1715 includes a glass layer with a particular index of refraction. Some embodiments also include an optical sensing module 1760 disposed below the display module 1710 to detect an optical biometric feature by receiving probe light that passes through the display module 1710. The optical sensing module 1760 can include an optical sensor array to receive the probe light, the probe light being the illumination energy output by the under-display lighting module as reflected by a top surface of the top cover layer 1715. Some embodiments also include one or more material layers 1735 disposed between the display pixel layer 1730 and the optical sensing module 1760 and configured to form a sensor receiving light path window 1740 located directly above the optical sensing module 1760.

Embodiments of the under-display lighting module include a light source to output illumination energy, and an optical structure optically coupled with the light source. The optical structure is configured to form an image of the illumination energy that is positioned and sized to pass through one of the micro-structure gaps and to diverge therefrom into the top cover layer 1715, thereby illuminating at least a portion of the display module 1710. In different embodiments, the light source and optical structure can be implemented differently.

In some embodiments (e.g., as in FIGS. 18A-18C), the display micro-structures (e.g., micro-structures 1810) lie substantially in a plane. The light source (e.g., illumination device 1820) is positioned below the display pixel layer 1730 and has an illumination aperture oriented to output the illumination energy through the display pixel layer 1730 and into the top cover layer 1715. The optical structure includes a lens (e.g., lens 1825) positioned between the illumination aperture and the display pixel layer 1730, such that a focal point of the lens is substantially at the plane. The light source and the lens are arranged so that the illumination energy diverges between the illumination aperture and the lens and converges between the lens and the plane to form the image of the illumination energy that is positioned and sized to pass through the one of the micro-structure gaps. In some such embodiments (e.g., as illustrated in FIG. 18C), the illumination aperture is oriented to output the illumination energy primarily in a direction substantially orthogonal to the plane. In other such embodiments, the illumination aperture can be tilted with respect to the plane, so as to output the illumination energy at an angle relative to the top cover layer 1715.

In other embodiments (e.g., as in FIGS. 20A and 20B), the display micro-structures (e.g., micro-structures 1910) include edge electrodes lying substantially in a plane along an edge area of a bottom surface of the top cover layer 1715. The light source (e.g., external light source 2065) is positioned below the display pixel layer 1730 and has an illumination aperture oriented to output the illumination energy in a first direction. The optical structure includes a light guide structure (e.g., light guide structures 2020) having an input to receive the illumination energy from the light source and an output to redirect the illumination energy to a second direction different from the first direction, the second direction being oriented to output the illumination energy through the plane and into the top cover layer 1715. The light source and the light guide structure are arranged so that the image of the illumination energy is formed substantially at the output of the light guide structure positioned and sized to pass through the one of the micro-structure gaps, and the illumination energy diverges between the output of the light guide structure and the top cover layer 1715. In some such embodiments, the optical structure further comprises a lens to optically couple the light source with the light guide structure. In some such embodiments, the light guide structure includes an optical fiber. In some such embodiments, the first direction is substantially orthogonal to the second direction.

In some embodiments, the under-display lighting module includes multiple light sources, each to output respective illumination energy; and multiple optical structures, each optically coupled with a respective one of the light sources to form a respective image of the respective illumination energy that is positioned and sized to pass through a different respective one of the micro-structure gaps and to diverge therefrom into the top cover layer 1715. In some such embodiments, each of the light sources outputs the respective illumination energy in accordance with a same modulation and wavelength. In other such embodiments, a first of the light sources outputs the respective illumination energy in accordance with a first set of optical characteristics, and a second of the light sources outputs the respective illumination energy in accordance with a second set of optical characteristics that is at least partially different from the first set of optical characteristics. For example, each light source can output illumination energy with a different respective modulation and/or wavelength. Some embodiments further include a dark layer (e.g., dark layer 1745) coating at least a portion of a bottom surface of the top cover layer 1715. In such embodiments, the under-display lighting module is configured to output the illumination energy so that the dark layer 1745 is at least partially transparent to the illumination energy passing there-through.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. An electronic device comprising:
 a display module comprising a display pixel layer having a plurality of display micro-structures having a plurality of micro-structure gaps there-between, the plurality of display micro-structures comprising a network of pixels interconnected by electrodes, the display pixel layer having a sensing area and having an edge area separate from the sensing area in which a density of the electrodes is low relative to the density of the electrodes in the sensing area, such that a size of each of the plurality of micro-structure gaps disposed in the edge area is relatively large and the size of each of the plurality of micro-structure gaps in the sensing area is relatively small;

a top cover layer disposed above the display module to provide an output interface for displaying images generated by the display pixel layer;

an optical sensing module disposed below the display module in the sensing area; and an under-display lighting module comprising:
a light source to output illumination energy; and
an optical structure optically coupled with the light source to form an image of the illumination energy that is positioned and sized to pass through one of the plurality of micro-structure gaps in the edge area of the display pixel layer and to diverge therefrom into the top cover layer, thereby illuminating at least a portion of the display module.

2. The electronic device of claim 1, wherein:
the top cover layer is configured to reflect portions of the illumination energy output by the light source back through the display module toward the optical sensing module in an optical pattern that corresponds to a contact pattern between a biometric feature and a top surface of the top cover layer; and
the optical sensing module comprises an optical sensor array configured to optically detect the biometric feature by detecting the optical pattern of the reflected portions of the illumination energy.

3. The electronic device of claim 1, wherein the display module further comprises one or more material layers disposed between the display pixel layer and the optical sensing module and configured to form a sensor receiving light path window located directly above the optical sensing module.

4. The electronic device of claim 1, wherein:
the plurality of display micro-structures lie substantially in a plane;
the light source is positioned below the display pixel layer and has an illumination aperture oriented to output the illumination energy through the display pixel layer and into the top cover layer;
the optical structure comprises a lens positioned between the illumination aperture and the display pixel layer, such that a focal point of the lens is substantially at the plane; and
the light source and the lens are arranged so that the illumination energy diverges between the illumination aperture and the lens and converges between the lens and the plane to form the image of the illumination energy that is positioned and sized to pass through the one of the plurality of micro-structure gaps.

5. The electronic device of claim 4, wherein the illumination aperture is oriented to output the illumination energy primarily in a direction substantially orthogonal to the plane.

6. The electronic device of claim 1, wherein:
the plurality of display micro-structures comprise a plurality of edge electrodes lying substantially in a plane along the edge area;
the light source is positioned below the display pixel layer and has an illumination aperture oriented to output the illumination energy in a first direction;
the optical structure comprises a light guide structure having an input to receive the illumination energy from the light source and an output to redirect the illumination energy to a second direction different from the first direction, the second direction being oriented to output the illumination energy through the plane and into the top cover layer; and the light source and the light guide structure are arranged so that the image of the illumination energy is formed substantially at the output of the light guide structure positioned and sized to pass through the one of the plurality of micro-structure gaps, and the illumination energy diverges between the output of the light guide structure and the top cover layer.

7. The electronic device of claim 6, wherein:
the optical structure further comprises a lens to optically couple the light source with the light guide structure.

8. The electronic device of claim 6, wherein the light guide structure comprises an optical fiber.

9. The electronic device of claim 6, wherein the first direction is substantially orthogonal to the second direction.

10. The electronic device of claim 1, wherein the display module comprises a liquid crystal display (LCD) panel, the plurality of display micro-structures comprising a plurality of liquid crystal structures interconnected by a plurality of electrodes to output images for display.

11. The electronic device of claim 1, wherein:
the one of the plurality of micro-structure gaps has a gap width of less than ten microns; and
the image is formed to be smaller than the gap width.

12. The electronic device of claim 1, wherein the under-display lighting module comprises:
a plurality of light sources, each to output respective illumination energy; and
a plurality of optical structures, each optically coupled with a respective one of the light sources to form a respective image of the respective illumination energy that is positioned and sized to pass through a different respective one of the plurality of micro-structure gaps and to diverge therefrom into the top cover layer.

13. The electronic device of claim 12, wherein each of the plurality of light sources outputs the respective illumination energy in accordance with a same modulation and wavelength.

14. The electronic device of claim 12, wherein a first of the plurality of light sources outputs the respective illumination energy in accordance with a first set of optical characteristics, and a second of the plurality of light sources outputs the respective illumination energy in accordance with a second set of optical characteristics that is at least partially different from the first set of optical characteristics.

15. The electronic device of claim 1, further comprising:
a dark layer coating at least a portion of a bottom surface of the top cover layer,
wherein the under-display lighting module is configured to output the illumination energy so that the dark layer is at least partially transparent to the illumination energy passing there-through.

16. The electronic device of claim 1, wherein:
the display module further comprises a touch sensor layer; and
the top cover layer further provides an input interface for receiving touch events detected by the touch sensor layer.

17. The electronic device of claim 1, wherein the light source is one of a light emitting diode or a vertical cavity surface-emitting laser.

18. The electronic device of claim 1, wherein the display module, the top cover layer, and the under-display lighting module are integrated into a smartphone.

\* \* \* \* \*